United States Patent
Chen et al.

(10) Patent No.: US 10,172,157 B2
(45) Date of Patent: Jan. 1, 2019

(54) PUCCH MANAGEMENT FOR ENHANCED CARRIER AGGREGATION

(71) Applicant: QUALCOMM Incorporated, San Diego, CA (US)

(72) Inventors: Wanshi Chen, San Diego, CA (US); Jelena Damnjanovic, Del Mar, CA (US); Madhavan Srinivasan Vajapeyam, San Diego, CA (US); Peter Gaal, San Diego, CA (US); Hao Xu, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 213 days.

(21) Appl. No.: 15/057,795

(22) Filed: Mar. 1, 2016

(65) Prior Publication Data

US 2016/0270063 A1  Sep. 15, 2016

Related U.S. Application Data

(60) Provisional application No. 62/132,461, filed on Mar. 12, 2015.

(51) Int. Cl.
*H04W 72/04* (2009.01)
*H04W 74/08* (2009.01)
(Continued)

(52) U.S. Cl.
CPC ........ *H04W 74/0808* (2013.01); *H04L 5/00* (2013.01); *H04W 16/14* (2013.01)

(58) Field of Classification Search
CPC .... H04L 5/00; H04W 16/14; H04W 74/0808; H04W 72/0413; H04W 72/0446; H04W 74/002
See application file for complete search history.

(56) References Cited

U.S. PATENT DOCUMENTS 9,107,208 B2 * 8/2015 Kim .................. H04L 5/0051
9,801,143 B2 * 10/2017 Ouchi ................ H04W 52/146
(Continued)

FOREIGN PATENT DOCUMENTS

WO     2010124228 A2    10/2010

OTHER PUBLICATIONS

Huawei: "PUCCH Design for Carrier Aggregation," 3GPP Draft; R1-093838, 3rd Generation Partnership Project (3GPP), Mobile Competence Centre ; 650, Route Des Lucioles ; F-06921 Sophia-Antipolis Cedex; France, no. Miyazaki; Oct. 12, 2009, Oct. 12, 2009 (Oct. 12, 2009), XP050388345, [retrieved on Oct. 6, 2009].

(Continued)

*Primary Examiner* — Rebecca E Song
*Assistant Examiner* — Nourali Mansoury
(74) *Attorney, Agent, or Firm* — Arent Fox, LLP

(57) ABSTRACT

A method, an apparatus, and a computer readable-medium for wireless communication are provided. The apparatus receives data via a first group of component carriers (CCs) of a plurality of groups of aggregated CCs. The first group of CCs correspond to unlicensed or shared frequencies. The apparatus selects a CC from at least two CCs of the first group of CCs for transmission on a physical uplink control channel (PUCCH). The selection of the CC is based on at least an uplink-transmission clearance status of each of the at least two CCs. The apparatus transmits the PUCCH via the selected CC.

28 Claims, 16 Drawing Sheets

(51) Int. Cl.
H04L 5/00 (2006.01)
H04W 16/14 (2009.01)

(56) References Cited

U.S. PATENT DOCUMENTS

| | | | | |
|---|---|---|---|---|
| 2010/0271970 | A1* | 10/2010 | Pan | H04L 1/0026 370/252 |
| 2010/0272048 | A1 | 10/2010 | Pan et al. | |
| 2013/0329678 | A1* | 12/2013 | Pan | H04L 1/1635 370/329 |
| 2014/0219202 | A1* | 8/2014 | Kim | H04L 1/1861 370/329 |
| 2014/0362780 | A1* | 12/2014 | Malladi | H04W 16/14 370/329 |
| 2016/0242186 | A1* | 8/2016 | Nissila | H04L 5/001 |

OTHER PUBLICATIONS

Huawei: "PUCCH design for carrier aggregation" 3GPP Draft; RI-090813, 3rd Generation Partnership Project (3GPP), Mobile Competence Centre ; 650, Route Des Luci0les ; F-06921 Sophia-Antipolis Cedex ; France, no. Athens, Greece; Feb. 3, 2009, Feb. 3, 2009 (Feb. 3, 2009), XP050318670 [retrieved on Feb. 3, 2009] p. 1, paragraph 1-p. 3, paragraph 3.2; figures 1-2 p. 5, paragraph 3.2.3.
International Search Report and Written Opinion—PCT/US2016/020512—ISA/EPO—dated Jul. 7, 2016.
Nokia Corporation et al., "Overview of Possible LAA impact to RAN2," 3GPP Draft; R2-150188 Overview of Possible LAA Impacts to RAN2, 3rd Generation Partnership Project (3GPP), Mobile Competence Centre; 650, Route Des Lucioles ; F-06921 Sophia-Antipolis Cedex; France, vol. RAN WG2, no. Athens, Greece; Feb. 9, 2015-Feb. 13, 2015 Feb. 8, 2015 (Feb. 8, 2015), XP050935534, Retrieved from the Internet: URL:http://www.3gpp.org/ftp/Meetings_3GPP_SYNC_RAN2/Docs/ [retrieved on Feb. 8, 2015].
Panasonic: "UL ACK/NACK Transmission on PUCCH for Carrier Aggregation," 3GPP Draft; R1-091170, 3rd Generation Partnership Project (3GPP), Mobile Competence Centre; 650, Route Des Lucioles; F-06921 Sophia-Antipolis Cedex; France, no. Seoul, Korea; Mar. 17, 2009, Mar. 17, 2009, XP050338790.

* cited by examiner

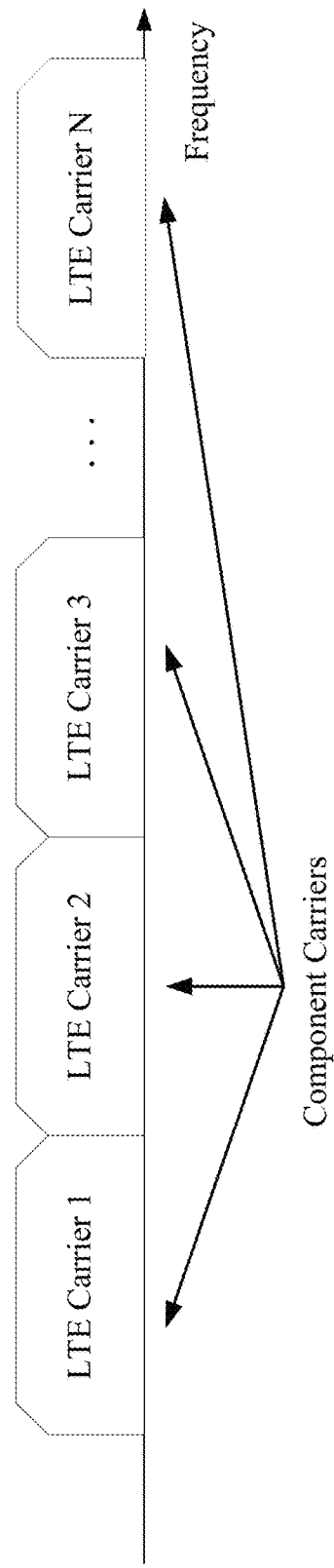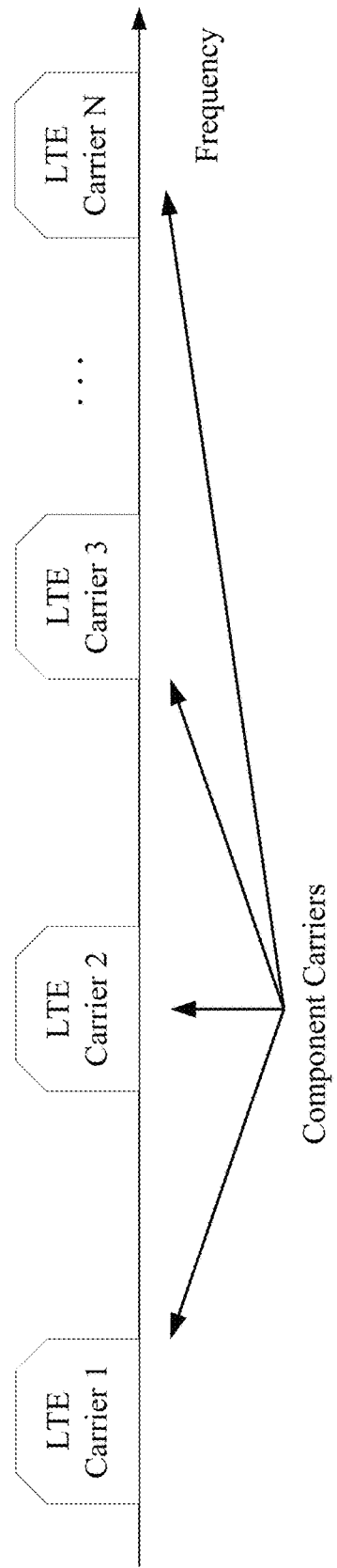
FIG. 5A
FIG. 5B

PUCCH MANAGEMENT FOR ENHANCED CARRIER AGGREGATION

CROSS-REFERENCE TO RELATED APPLICATION(S)

This application claims the benefit of U.S. Provisional Application Ser. No. 62/132,461, entitled "PUCCH MANAGEMENT FOR ENHANCED CARRIER AGGREGATION" and filed on Mar. 12, 2015, which is expressly incorporated by reference herein in its entirety.

BACKGROUND

Field

The present disclosure relates generally to communication systems, and more particularly, to managing a physical uplink control channel (PUCCH) for enhanced carrier aggregation (eCA).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

In carrier aggregation (CA), a user equipment (UE) may be configured with up to five component carriers (CCs). However, there may a need for increasing the number of CCs beyond five to provide higher bandwidth and increased data rates.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In CA, a UE may be configured with up to five CCs. Each of the CCs may be backward compatible. The bandwidth of each CC may be up to 20 MHz. Because a UE may be configured with up to five CCs in CA, up to 100 MHz may be configured for the UE.

However, there may a need for increasing the number of CCs beyond five to provide higher bandwidth and increased data rates. This may be referred to herein as enhanced CA, according to which a UE may be configured with more than five CCs (e.g., between six and thirty two CCs) for CA. Enhanced CA may require development of physical layer specifications for PUCCH on a secondary cell (SCell), and mechanisms to enable LTE CA for an increased number of CCs for the DL and the UL, e.g., thirty two CCs for the downlink (DL) and the uplink (UL) may be specified. The mechanisms may include enhancements to DL control signaling for the increased number of CCs, possibly including both self-scheduling and cross-carrier scheduling. The mechanisms may include enhancements to UL control signaling for the number of CCs greater than five. These enhancements may include enhancements to support uplink control information (UCI) feedback on the PUCCH for the increased number of DL carriers. For example, the enhancements may relate to UCI signaling formats to support UCI feedback for more than five DL carriers. The mechanisms may also include enhancements to support UCI feedback on the PUSCH for more than five DL carriers. Various approaches for enhanced CA UCI feedback may be discussed infra in the "Detailed Description".

In an aspect of the disclosure, a method, a computer program product, a computer-readable medium, and an apparatus may be provided. A method includes receiving data via a first group of CCs of a plurality of groups of aggregated CCs. The first group of CCs correspond to unlicensed or shared frequencies. A CC is selected from at least two CCs of the first group of CCs for transmission (e.g., of signaling) on a PUCCH. The selection of the CC may based on at least an uplink-transmission clearance status of each of the at least two CCs. The method also includes transmission on the PUCCH via the selected CC.

An apparatus includes at least one processor configured to receive data via a first group of CCs of a plurality of groups of aggregated CCs. The first group of CCs correspond to unlicensed or shared frequencies. The at least one processor is further configured to select a CC from at least two CCs of the first group of CCs for transmission (e.g., of signaling) on a PUCCH. The selection of the CC may based on at least an uplink-transmission clearance status of each of the at least two CCs. The at least one processor is also configured to transmit on the PUCCH via the selected CC. A memory is coupled to the at least one processor.

An apparatus includes means for receiving data via a first group of CCs of a plurality of groups of aggregated CCs. The first group of CCs correspond to unlicensed or shared frequencies. The apparatus further includes means for selecting a CC from at least two CCs of the first group of CCs for transmission (e.g., of signaling) on a PUCCH. The selection of the CC may based on at least an uplink-transmission clearance status of each of the at least two CCs. The apparatus also includes means for transmitting on the PUCCH via the selected CC.

A computer-readable medium includes code for receiving data via a first group of CCs of a plurality of groups of aggregated CCs. The first group of CCs correspond to unlicensed or shared frequencies. The computer-readable medium further includes code for selecting a CC from at least two CCs of the first group of CCs for transmission (e.g., of signaling) on a PUCCH. The selection of the CC may based on at least an uplink-transmission clearance status of each of the at least two CCs. The computer-readable medium also includes code for transmitting on the PUCCH via the selected CC.

According to another aspect, a method includes transmitting information for configuring a UE to select at most a first CC or a second CC of a plurality of aggregated CCs, for transmission (e.g., of signaling) on a PUCCH. The first CC and the second CC correspond to unlicensed or shared frequencies. The selection of the at most the first CC or the second CC may based on at least an uplink-transmission clearance status of each of the first CC and the second CC. The method also includes receiving transmission on the PUCCH via the selected at most the first CC or the second CC.

An apparatus includes at least one processor configured to transmit information for configuring a UE to select at most a first CC or a second CC of a plurality of aggregated CCs, for transmission (e.g., of signaling) on a PUCCH. The first CC and the second CC correspond to unlicensed or shared frequencies. The selection of the at most the first CC or the second CC may based on at least an uplink-transmission clearance status of each of the first CC and the second CC. The at least one processor is also configured to receive transmission on the PUCCH via the selected at most the first CC or the second CC. A memory is coupled to the at least one processor.

An apparatus includes means for transmitting information for configuring a UE to select at most a first CC or a second CC of a plurality of aggregated CCs, for transmission (e.g., of signaling) on a PUCCH. The first CC and the second CC correspond to unlicensed or shared frequencies. The selection of the at most the first CC or the second CC may based on at least an uplink-transmission clearance status of each of the first CC and the second CC. The apparatus also includes means for receiving transmission on the PUCCH via the selected at most the first CC or the second CC.

A computer-readable medium includes code for transmitting information for configuring a UE to select at most a first CC or a second CC of a plurality of aggregated CCs, for transmission (e.g., of signaling) on a PUCCH. The first CC and the second CC correspond to unlicensed or shared frequencies. The selection of the at most the first CC or the second CC may based on at least an uplink-transmission clearance status of each of the first CC and the second CC. The computer-readable medium also includes code for receiving transmission on the PUCCH via the selected at most the first CC or the second CC.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 5A is a diagram illustrating an example of continuous carrier aggregation.

FIG. 5B is a diagram illustrating an example of non-continuous carrier aggregation.

DETAILED DESCRIPTION

Figure 1:
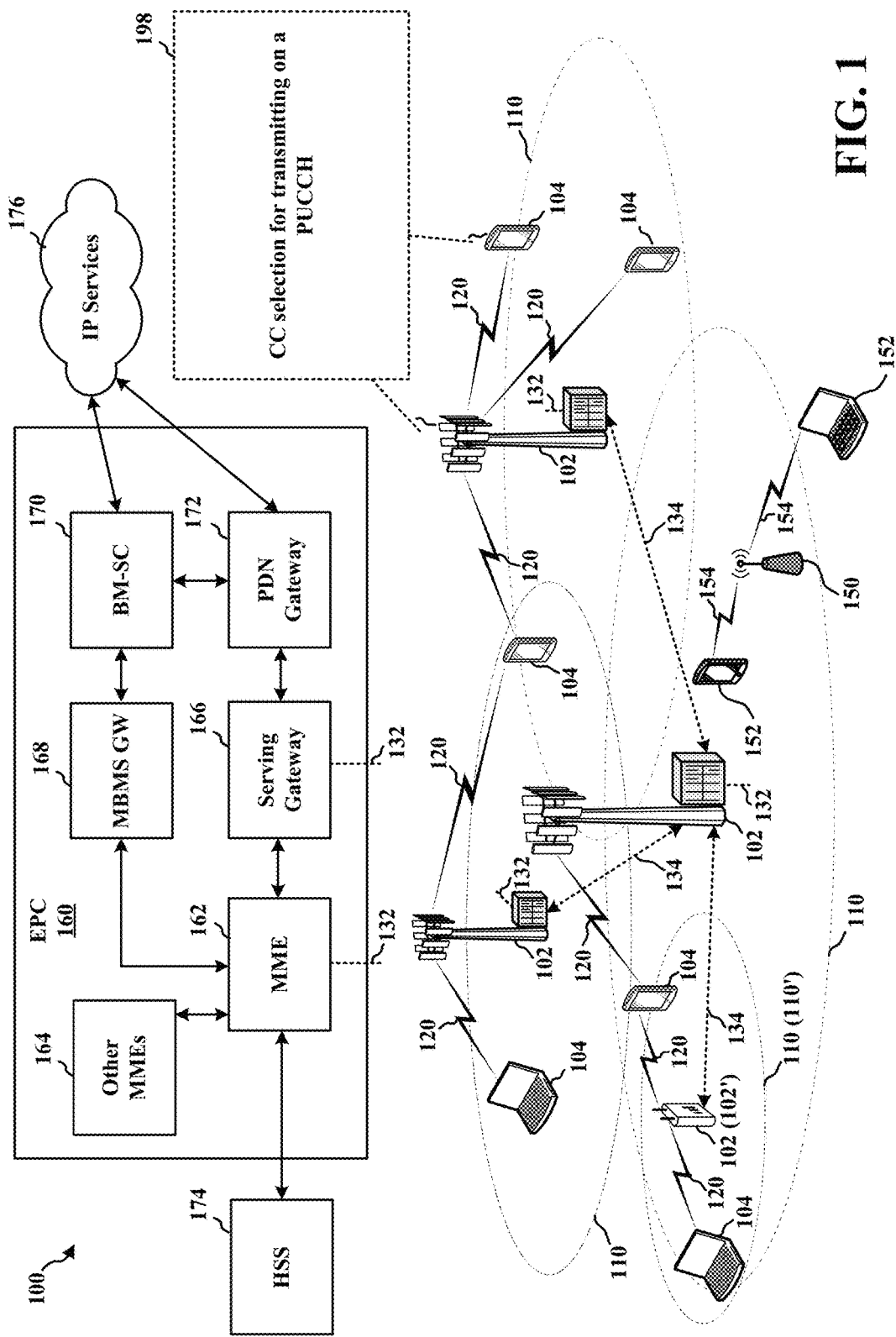
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), flash memory, phase change memory, optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs, etc. The small cells include femtocells, picocells, microcells, etc.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS (evolved or enhanced MBMS) related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a positioning/navigation device, a multimedia device, a video device, a digital audio player (e.g., MP3 player), a camera, a game console, a tablet, a netbook, an ultrabook, a smart device, a wearable device (e.g., smart watch, smart glasses, smart bracelet, smart wristband, smart ring, smart clothing, heads-up display), a drone, a robot/robotic device, a medical device, a vehicular device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, a terminal, an access terminal, a mobile terminal, a wireless terminal, a remote terminal, a handset, a user agent, a mobile client, a client, or some other suitable terminology. UEs may be implemented as machine type communication(s) (MTC) devices, enhanced or evolved MTC (eMTC) devices, internet of everything (IoE) devices, or internet of things (IoT) devices (e.g., narrowband IoT (NB-IoT) devices). These types of devices may engage in communication involving at least one remote device on at least one end of the communication and may include forms of data communication which involve one or more entities that do not necessarily need human interaction. Example of such devices may include sensors, meters, monitors, location tags, drones, trackers, robots/robotic devices, etc.

Referring again to FIG. 1, in certain aspects, the UE 104 may be configured to receive data via a first group of CCs of a plurality of groups of aggregated CCs, the first group of CCs corresponding to unlicensed or shared frequencies, select a CC from at least two CCs of the first group of CCs for transmission on a PUCCH, wherein the selection of the CC may based on at least an uplink-transmission clearance status of each of the at least two CCs, and transmit on the PUCCH via the selected CC (198). In other aspects, the eNB 102 104 may be configured to transmit information for configuring a UE to select at most a first CC or a second CC of a plurality of aggregated CCs, for transmission (e.g., of signaling) on a PUCCH, wherein the first CC and the second CC correspond to unlicensed or shared frequencies, and receive the PUCCH via the selected at most the first CC or the second CC.

Figures 2A, 2B, 2C, 2D:
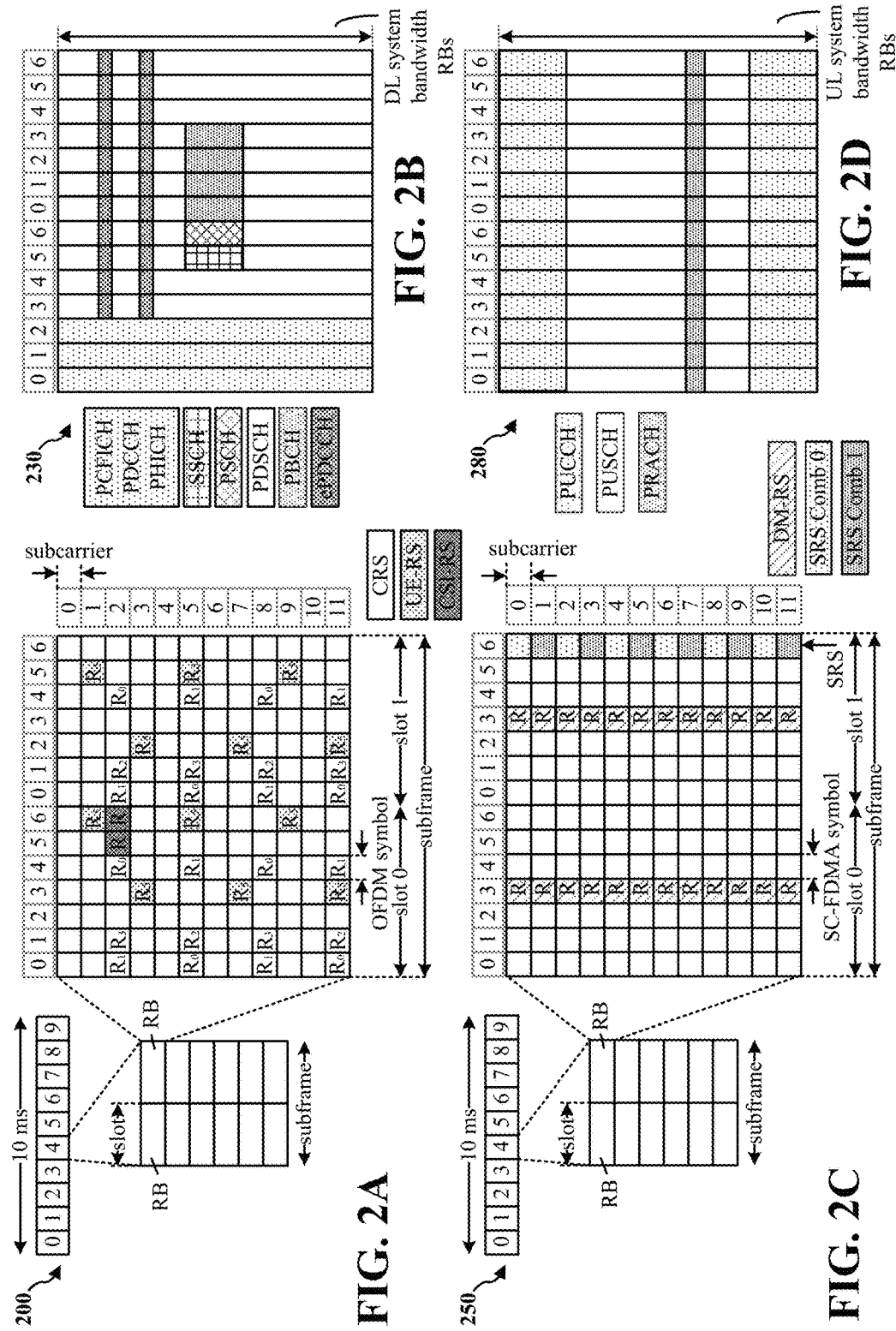
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
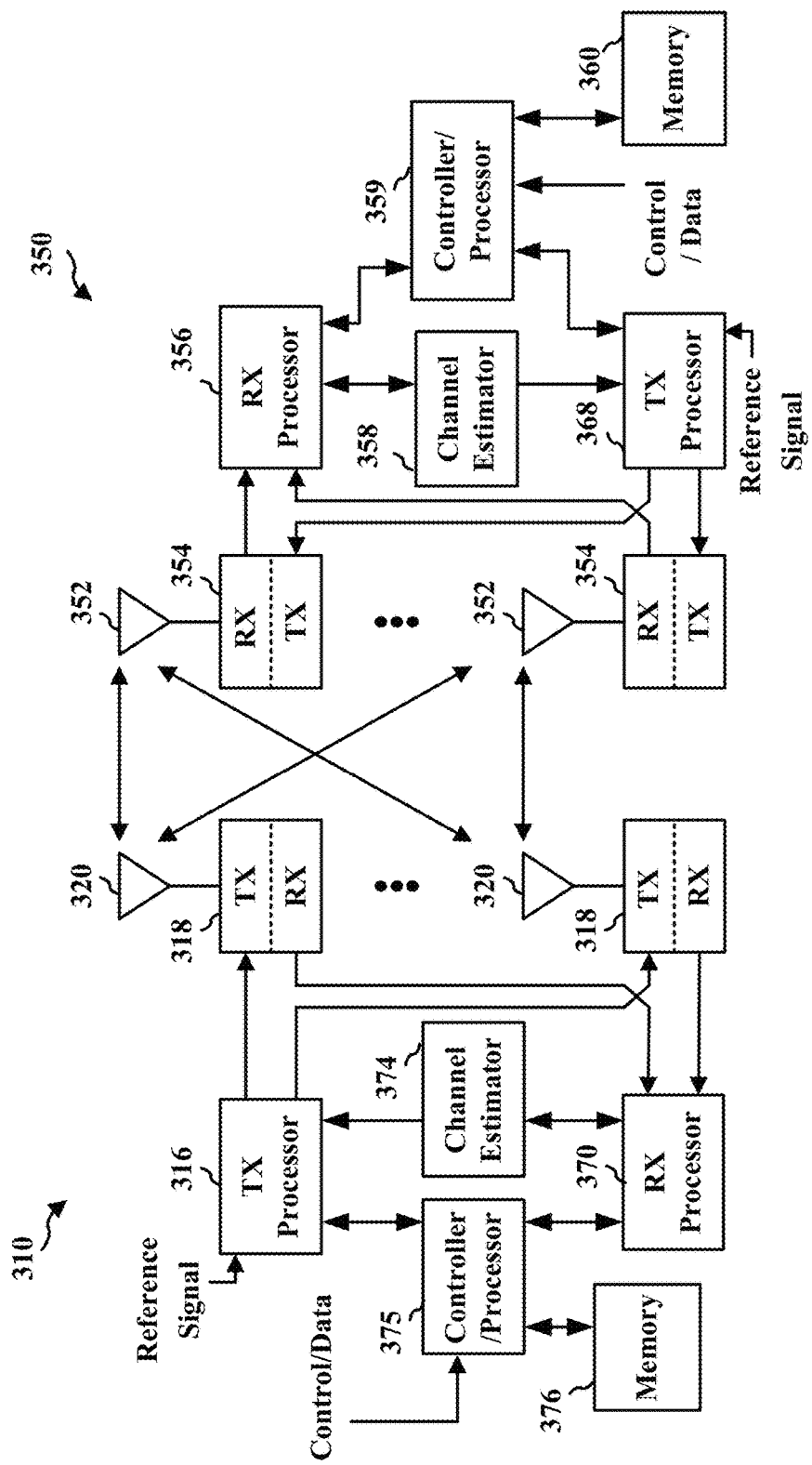
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations. Controller/processors 375 and 359 may direct the operations at eNB 310 and UE 350, respectively. For example, controller/processor 375 and/or other processors and modules at eNB 310 may perform or direct operations 1400 illustrated in FIG. 14 and/or other processes for the techniques described herein. Similarly, controller/processor 359 and/or other processors and modules at UE 350 may perform or direct operations 1100 illustrated in FIG. 11 and/or processes for the techniques described herein. Memories 376 and 360 may store data and program codes for eNB 310 and UE 350, respectively.

Figure 4:
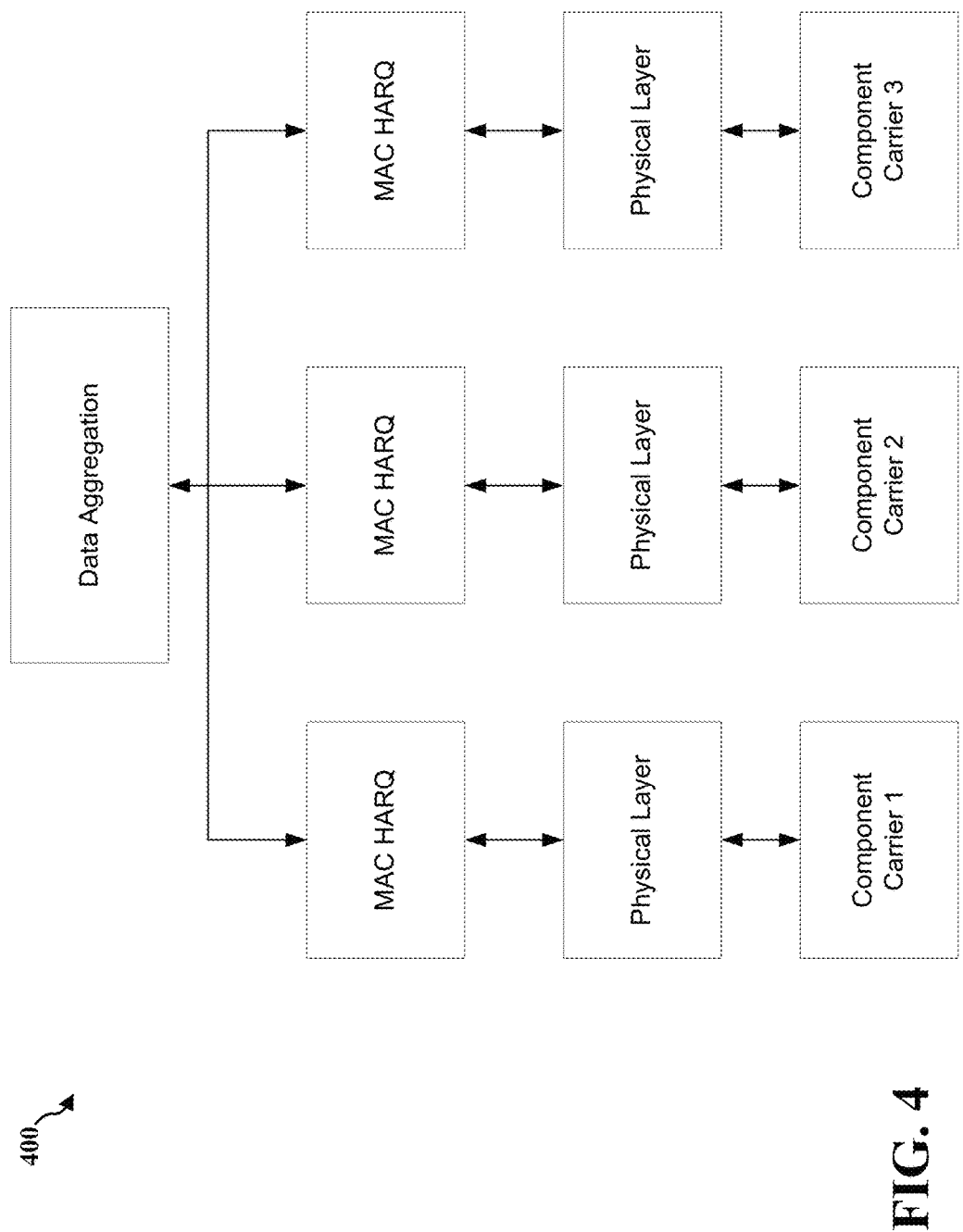
FIG. 4 is a diagram illustrating a MAC layer data aggregation.

FIG. 4 illustrates aggregating transmission blocks (TBs) from different component carriers at the medium access control (MAC) layer. With MAC layer data aggregation, each component carrier may have its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity may be provided for each component carrier.

UEs may use spectrums up to 20 MHz bandwidths allocated in a carrier aggregation of up to a total of 100 MHz (5 component carriers) used for transmission in each direction. Generally, less traffic may be transmitted on the uplink than on the downlink, so the UL spectrum allocation may be smaller than the DL allocation. For example, if 20 MHz is assigned to the UL, the DL may be assigned 100 Mhz. These asymmetric FDD assignments conserve spectrum and may be a good fit for the typically asymmetric bandwidth utilization by broadband subscribers.

There may be two types of carrier aggregation (CA) methods, continuous CA and non-continuous CA. The two types of CA methods may be illustrated in FIGS. 5A and 5B. Non-continuous CA occurs when multiple available CCs may be separated along the frequency band (FIG. 5B). On the other hand, continuous CA occurs when multiple available component carriers may be adjacent to each other (FIG. 5A). Both non-continuous and continuous CA aggregate multiple LTE/component carriers to serve a single UE.

In CA, a UE may be configured with up to 5 CCs. Each of the CCs may be backward compatible. The bandwidth of each CC may be up to 20 MHz. Because a UE may be configured with up to 5 CCs in CA, up to 100 MHz may be configured for the UE.

The aggregated CCs may be all configured for FDD, or may be all configured for TDD. Alternatively, the aggregated CCs may be a mixture (e.g., combination) of at least one CC configured for FDD and at least one CC configured for TDD. Different CCs configured for TDD may have the same or different DL/UL configurations. Special subframes may be configured differently for different CCs configured for TDD.

Among the aggregated CCs, one CC may be configured as the primary CC (PCC) for the UE. The PCC may be the CC that may carry a PUCCH and a common search space (CSS) for the UE. All other CCs may be referred to as secondary CCs (SCCs).

A PUCCH may be enabled on two CCs in CA for a UE. For example, in addition to the PCC, one SCC could carry a PUCCH as well. This may help to address, for example, dual-connectivity and PUCCH load balancing needs.

In some cases, cells (CCs) may not have ideal backhaul (e.g., connections between eNBs), and, consequently, tight coordination between the cells may not be possible due to limited backhaul capacity and non-negligible backhaul latency (e.g., tens of milliseconds). Dual-connectivity may address these issues.

In dual-connectivity, cells may be partitioned into two groups. The two groups may be the primary cell group (PCG) and the secondary cell group (SCG). Each group may have one or more cells in a CA configuration. Each group may have a single cell that carries a PUCCH. In the PCG, a primary cell, referred to as a PCell, may carry a PUCCH for the PCG. In the SCG, a secondary cell may carry a PUCCH for the SCG. This secondary cell may be referred to also as the SCell.

UCI may be separately conveyed to each group via the PUCCH associated with each group. A common search space may be monitored in the SCG by a UE. Semi-persistent scheduling (SPS) (or semi-static scheduling) and scheduling request(s) (SR) may be supported by the SCG as well.

There may be a need for increasing the number of CCs beyond five to provide higher bandwidth and increased data rates. This may be referred to herein as enhanced CA, according to which a UE may be configured with more than five CCs (e.g., between six and thirty two CCs) for CA. Enhanced CA may require the development of physical layer specifications for PUCCH on a SCell, and mechanisms to enable LTE CA for an increased number of CCs for the DL and the UL, e.g., thirty two CCs for the DL and the UL may be specified. The mechanisms may include enhancements to DL control signaling for the increased number of CCs, possibly including both self-scheduling and cross-carrier scheduling. The mechanisms may include enhancements to UL control signaling for the number of CCs greater than five. These enhancements may include enhancements to support UCI feedback on the PUCCH for the increased number of DL carriers. For example, the enhancements may relate to UCI signaling formats to support UCI feedback for more than five DL carriers. The mechanisms may also include enhancements to support UCI feedback on the PUSCH for more than five DL carriers.

Various approaches for enhanced CA UCI feedback may be utilized. According to one approach, UCI feedback for more than five DL carriers (e.g., up to thirty two DL carriers) may be carried on the PUCCH of the primary cell (PCell). Also, UCI feedback for more than five DL carriers (e.g., up to thirty two DL carriers) may be carried on the PUSCH of one cell. This approach may be applicable whether or not UL CA may be configured for UL CA capable devices (e.g., UL CA capable UEs). This approach may also be applicable for non-UL CA capable devices (e.g., non-UL CA capable UEs).

According to another approach, two or more PUCCH cell groups may be configured for more than five DL carriers (e.g., up to thirty two DL carriers). For example, each of the DL carriers may be associated with one of the PUCCH cell groups. This approach may be applicable when configuring UL CA.

Aspects of the disclosure may be directed to the management and/or handling of UCI feedback when two or more PUCCH cell groups are configured. The UCI may include HARQ ACK/NAK, CSI and/or SR.

When two or more PUCCH cell groups are configured, the transmission (e.g., of signaling) on the PUCCH may be independently managed across the PUCCH cell groups. Aspects that may be independently managed may include: determination of DL HARQ-ACK timing; PUCCH resource determination for HARQ-ACK and/or CSI; higher-layer configuration of simultaneous HARQ-ACK+CSI on PUCCH; and higher-layer configuration of simultaneous HARQ-ACK+SRS in one subframe.

A PUCCH cell group refers to a group of cells that utilize at least one PUCCH (e.g., a single PUCCH) to send UL UCI feedback. A PUCCH cell of a PUCCH cell group refers to a cell that may carry (e.g., sends or transmits) signaling on the PUCCH. The PUCCH cell may be the primary cell or a secondary cell.

When a UE may be configured with one or more PUCCH cells, none of the PUCCH cells may utilize unlicensed or shared spectrum. For example, each of the PUCCH cells may utilize licensed spectrum that is not shared by two or more operators. Accordingly, there may be no competition for PUCCH resources by different operators and there may be no loss of transmit opportunity on the PUCCH.

In the above situation, one or more PUCCH cell groups may be defined. Within a PUCCH cell group, UCI for CCs of the PUCCH cell group may be transmitted on the corresponding PUCCH of the PUCCH cell group. For example, UCI for a CC of the PUCCH cell group may be transmitted via (or on) the PUCCH of the PUCCH cell group, and not a PUCCH of another PUCCH cell group. Accordingly, there may be an orthogonal UCI split across different PUCCH cell groups. Also, cross-cell group transmission of UCI on PUCCH may not be performed because, for example, there may be potential loss of transmit opportunity on PUCCH due to competition between different operators.

Further, when no PUCCH cells utilize the unlicensed or shared spectrum, at most two PUCCH cell groups may be configured in a semi-static manner. The two PUCCH cell groups include: a PUCCH cell group on the primary cell; and a PUCCH cell group on a secondary cell. Dynamic switching of PUCCH cells within each of the PUCCH cell groups may not be performed with this approach.

As discussed supra, there may be no loss of PUCCH transmit opportunity on each PUCCH cell when none of the PUCCH cells utilize unlicensed or shared spectrum. In this situation, performing overlapping transmission of UCI or dynamic PUCCH cell update may not be necessary, e.g., in order to facilitate PUCCH load balancing with two PUCCH cells.

When at least one PUCCH cell utilizes unlicensed or shared spectrum, loss of transmit opportunity for a PUCCH transmission in such a cell may occur. In this situation, a UE may be required to compete for usage of the spectrum in the PUCCH cell. As an example, Wi-Fi networks may operate in an unlicensed spectrum, and, therefore, may be available for use by various entities (e.g., two or more operators) subject to established rules for providing fair access to the spectrum. Prior to gaining channel access and transmitting using the unlicensed spectrum, a transmitting device (e.g., a UE) may perform a listen-before-talk procedure to gain channel access. The listen-before-talk procedure may include a CCA to determine if a particular carrier is available. If that carrier is not available, a CCA may be performed again at a later time.

With respect to a situation in which at least one PUCCH cell may utilize unlicensed or shared spectrum, three configurations are described infra. In a first configuration, up to two PUCCH cells may be semi-statically managed. In a second configuration, more than two PUCCH cells may be semi-statically managed. A third configuration may include, e.g., up to two PUCCH cells, where at least one cell may be dynamically managed.

Figure 6:
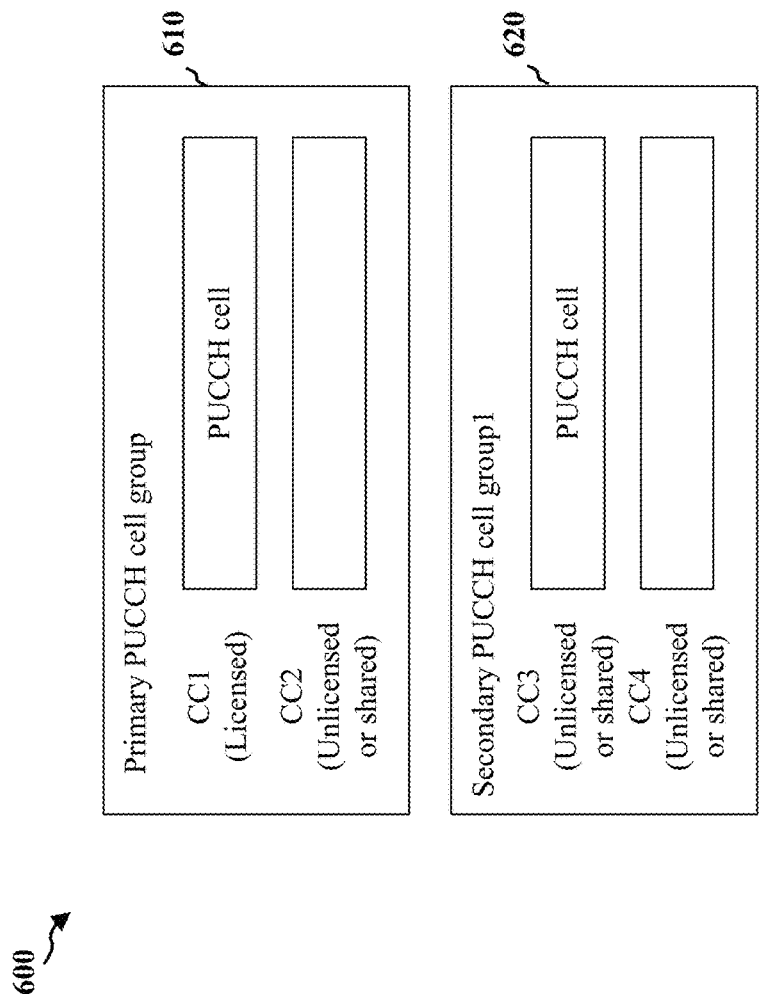
FIG. 6 illustrates a configuration in which there are up to two PUCCH cells that are semi-statically managed.

FIG. 6 illustrates a configuration 600 in which up to two PUCCH cells may be semi-statically managed. The configuration may include primary PUCCH cell group 610 and secondary PUCCH cell group 620. The primary PUCCH cell group 610 may include two CCs: CC1 and CC2. CC1 may utilize licensed spectrum, and CC2 may utilize unlicensed or shared spectrum. CC1 may be designated as a PUCCH cell for the primary PUCCH cell group 610. Accordingly, CC1 may carry PUCCH for the primary PUCCH cell group 610, and may carry UCI feedback for all of the CCs in the primary PUCCH cell group 610 (CC1, CC2). Because CC1 may utilize the licensed spectrum, a PUCCH transmission in the primary PUCCH cell group 610 may not involve potential loss of transmit opportunity on PUCCH due to competition between different operators.

The secondary PUCCH cell group 620 may include two CCs: CC3 and CC4. Both CC3 and CC4 utilize the unlicensed or shared spectrum. CC3 may be designated as a PUCCH cell for the secondary PUCCH cell group 620. Accordingly, CC2 may carry PUCCH for the secondary PUCCH cell group 620, and may carry UCI feedback for all of the CCs in the secondary PUCCH cell group 620 (CC3, CC4).

Because the PUCCH cell CC3 may utilize unlicensed or shared spectrum, CC3 may not enjoy the benefit of guaranteed transmission opportunities. For example, in LTE-U, CC3 may be required to perform listen-before-talk before performing a transmission, and transmission may fail if there are other ongoing transmissions (e.g., transmissions by one or more other operators). As a result, if the PUCCH cell fails to grab the channel, then transmission of UCI for all CCs in the PUCCH cell group may not occur if there are no PUSCH transmissions on other cells of the same cell group. As such, the UCI may be omitted from transmission (e.g., the UCI may not be transmitted during this transmission opportunity).

For example, with reference to FIG. 6, the PUCCH cell CC3 may carry UCI feedback for all of the cells in the secondary PUCCH cell group 620 (CC3, CC4). However, because CC3 utilizes unlicensed spectrum, CC3 may not be cleared for UL transmission during all times. If the PUCCH cell CC3 fails to grab the channel, then transmission of UCI for both CC3 and CC4 may not occur, e.g., if there are no PUSCH transmissions on CC4.

Another configuration may include more than two PUCCH cells that may be semi-statically managed. For example, the PUCCH cells may include at most two PUCCH cells in licensed spectra, and one or more PUCCH cells in unlicensed/shared spectra. With respect to licensed spectra, at most two PUCCH cells may be deemed sufficient. With respect to unlicensed/shared spectra, due to opportunistic PUCCH transmissions, two or more PUCCH cells may be configured in order to increase the possibility of UCI transmissions on the PUCCH, especially when the number of PUCCH cells in unlicensed/shared spectra may be flexibly configured.

Figure 7:
FIG. 7 illustrates a configuration in which more than two PUCCH cells may be semi-statically managed.

FIG. 7 illustrates a configuration 700 in which more than two PUCCH cells are semi-statically managed. As illustrated, the configuration includes primary PUCCH cell group 710 and secondary PUCCH cell groups 720 and 730. The primary PUCCH cell group 710 includes two CCs: CC1 and CC2. CC1 utilizes licensed spectrum, and CC2 utilizes unlicensed or shared spectrum. CC1 may be designated as a PUCCH cell for the primary PUCCH cell group 710, and may carry UCI feedback for all of the CCs in the primary PUCCH cell group 710 (CC1, CC2). Because CC1 utilizes licensed spectrum, PUCCH transmission in the primary PUCCH cell group 710 is guaranteed.

The secondary PUCCH cell group 720 may include CC3, and the secondary PUCCH cell group 730 may include CC4. CC3 and CC4 utilize unlicensed or shared spectrum. CC3 may be designated as a PUCCH cell for the secondary PUCCH cell group 720 and may carry UCI feedback for all of the CCs in the secondary PUCCH cell group 720 (CC3). CC4 may be designated as a PUCCH cell for the secondary PUCCH cell group 730 and may carry UCI feedback for all of the CCs in the secondary PUCCH cell group 730 (CC4).

Because CC3 utilizes unlicensed spectrum, CC3 may not be cleared for UL transmission during all times (e.g., when the CCA does not clear). If the PUCCH cell CC3 fails to grab the channel, then transmission of UCI for CC3 may not occur. However, during this time, CC4 may be cleared for UL transmission (e.g., when the CCA does clear). Accordingly, UCI for CC4 may be transmitted, even though the transmission of UCI for CC3 may not occur. Therefore, the failure of CC3 to grab the channel may not necessarily coincide with an omitted transmission of UCI for CC4. Accordingly, the failure of CC3 to grab the channel may cause omitted transmission of UCI for a fewer number of carriers (e.g., CC3) rather than for a greater number of carriers (e.g., CC3 and CC4).

Similarly, because CC4 utilizes unlicensed spectrum, CC4 may not be cleared for UL transmission during all times. If the PUCCH cell CC4 fails to grab the channel, then transmission of UCI for CC4 may not occur. However, during this time, CC3 may be cleared for UL transmission. Accordingly, UCI for CC3 may be transmitted, even though the transmission of UCI for CC4 may not occur. Therefore, the failure of CC4 to grab the channel may not necessarily coincide with omitted transmission of UCI for CC3.

Another configuration may include a number of PUCCH cells (e.g., up to two PUCCH cells) that include at least one PUCCH cell that is dynamically managed. The PUCCH cell that is dynamically managed may be located in a PUCCH cell group where all cells in the group utilize unlicensed/shared spectra. As will be described in more detail supra, a cell may be designated (or selected) as the PUCCH cell at a particular time (e.g., at a particular frame, at a particular subframe) for the PUCCH cell group. The selection may depend on the cell ID and whether the cell is cleared for UL transmission.

Figure 8:
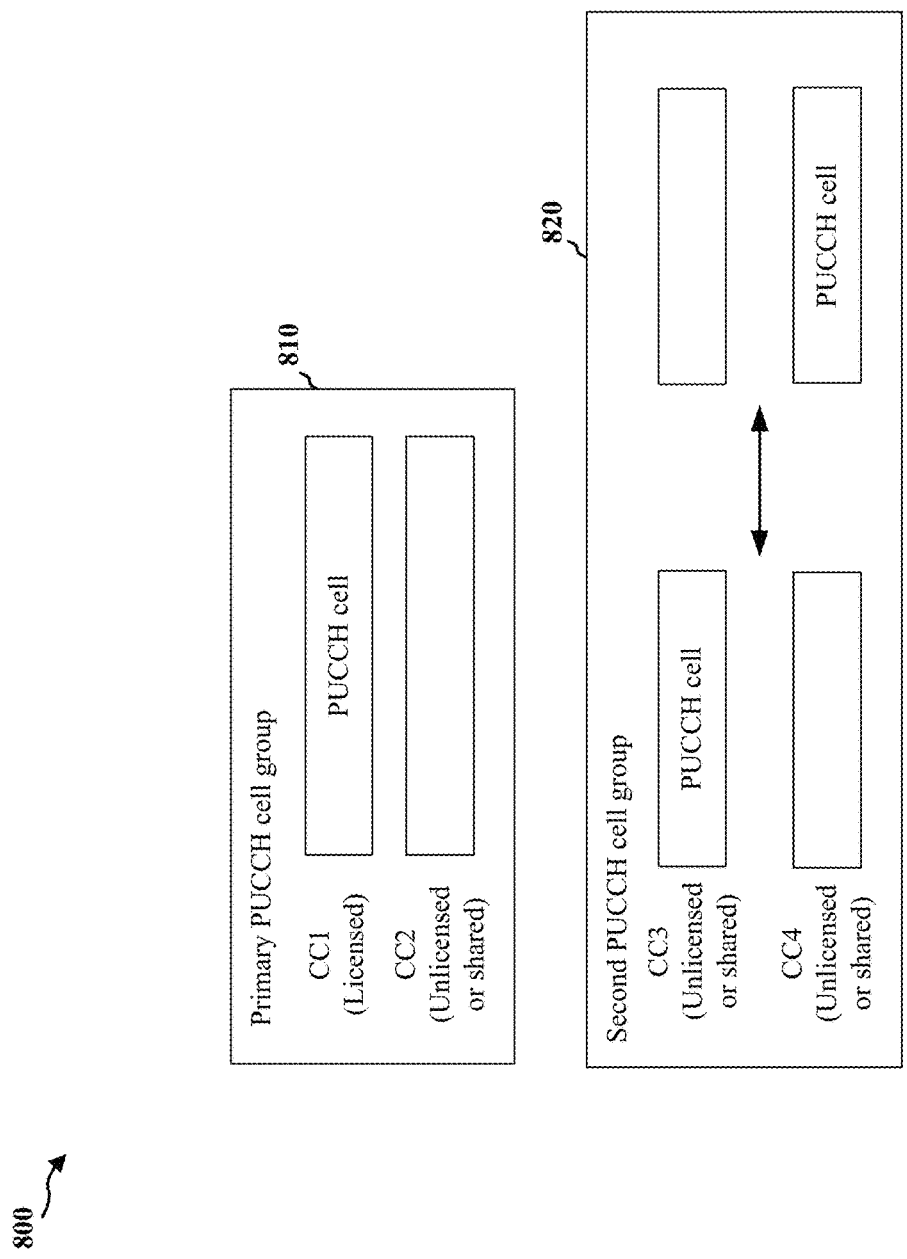
FIG. 8 illustrates a configuration in which one of two PUCCH cells is dynamically managed.

FIG. 8 illustrates a configuration 800 in which the PUCCH cell of one of two PUCCH cell groups is dynamically managed. The configuration includes primary PUCCH cell group 810 and secondary PUCCH cell group 820. The primary PUCCH cell group 810 may include two CCs: CC1 and CC2. CC1 utilizes the licensed spectrum, and CC2 utilizes unlicensed or shared spectrum. CC1 may be designated as a PUCCH cell for the primary PUCCH cell group 810, and may carry UCI feedback for all of the CCs in the primary PUCCH cell group (CC1, CC2). Because CC1 utilizes the licensed spectrum, PUCCH transmission in the primary PUCCH cell group 810 is guaranteed.

The secondary PUCCH cell group 820 may include CC3 and CC4. CC3 and CC4 utilize unlicensed or shared spectrum. At one time (e.g., a particular frame or a particular subframe of a radio frame), CC3 may be designated as a PUCCH cell for the secondary PUCCH cell group 820 and may carry UCI feedback for all of the CCs in the secondary PUCCH cell group 820 (CC3, CC4). At another time (e.g., another frame, or another subframe of the same radio frame), CC4 may be designated as the PUCCH cell for the secondary PUCCH cell group 820 and may carry UCI feedback for all of the CCs in the secondary PUCCH cell group 820 (CC3, CC4). Because the PUCCH cell for the secondary PUCCH cell group 820 may be CC3 at one time and may be CC4 at another time, the PUCCH cell is dynamically managed for the secondary PUCCH cell group 820.

Because CC3 utilizes unlicensed spectrum, CC3 may not be cleared for UL transmission at a particular time. However, CC4 may be cleared for UL transmission at that time. If the PUCCH cell for the secondary PUCCH cell group 820 is dynamically managed such that CC4 may be selected accordingly as the PUCCH cell, then UCI for CC3 and CC4 may be transmitted (e.g., via CC4) during that time.

Similarly, because CC4 utilizes unlicensed spectrum, CC4 may not be cleared for UL transmission at a particular time. However, CC3 may be cleared for UL transmission at that time. If the PUCCH cell for the secondary PUCCH cell group 820 is dynamically managed such that CC3 may be selected accordingly as the PUCCH cell, then UCI for CC3 and CC4 may be transmitted (via CC3) during that time.

Accordingly, as long as one of the CCs (e.g., CC3 or CC4) in the secondary PUCCH cell group 820 may be cleared for UL transmission at a particular time, then the UCI for the CCs may be transmitted during that time. Therefore, a reduction in the likelihood that a loss of transmit opportunity on PUCCH may occur due to competition between different operators may be achieved.

The CCs included in a PUCCH cell group in which PUCCH management is dynamically performed (e.g., the secondary PUCCH cell group 820) will now be described with reference to various aspects. Also, the dynamic selection of the PUCCH cell in such a PUCCH cell group will be described with reference to various aspects.

According to one aspect, the cells included in the same PUCCH cell group (e.g., CC3 and CC4 of secondary PUCCH cell group 820) may be synchronous with respect to UL transmission. In this regard, the difference in UL transmission times for any two cells may be relatively short (e.g., less than or equal to around 31.3 μsec). Such cells may belong to different timing advance groups (TAGs). In addition, the cells may have the same or different system types (e.g., FDD/TDD) and/or different DL/UL subframe configurations (e.g., with respect to TDD).

According to one aspect, when two or more cells have asynchronous UL transmissions (e.g., such that differences in UL transmission times are greater than around 31.3 μsec), these cells may be assigned to different PUCCH cell groups, such that synchronous UL transmission may be achieved within each PUCCH cell group. Otherwise, determining the PUCCH cell for a particular PUCCH cell group may involve consideration of UL timing in addition to consideration of other factor(s). Therefore, according to one aspect, different PUCCH cell groups may be configured for cells (e.g., different frequency bands) that have asynchronous UL transmissions.

As described earlier with reference to FIG. 8, either CC3 or CC4 may be selected, from the secondary PUCCH cell group 820, as the PUCCH cell that carries PUCCH for the cell group. It will be appreciated that such a PUCCH cell group may include more than two CCs (e.g., five CCs). According to one aspect, any of the CCs in the PUCCH cell group may be selected to serve as the PUCCH cell at a particular time. By increasing the number of CCs from which the PUCCH cell may be selected, the likelihood of successful PUCCH transmission for the PUCCH cell group may also be increased. In this regard, performance may be enhanced.

According to another aspect, any of a subset of CCs in the PUCCH cell group may be selected to serve as the PUCCH cell at a particular time. For example, if a particular PUCCH cell group may include five CCs, any CC that is included in a particular subset of the five CCs may be selected to serve as the PUCCH cell at a particular time. By way of example, the subset may include no more than three of the five CCs. By reducing the number of CCs from which the PUCCH cell may be selected, complexity may be reduced, from the perspective of the UE as well as from the perspective of the eNB. For example, a UE preparing to transmit PUCCH may analyze fewer CCs when determining which CC may transmit PUCCH. Accordingly, a degree of operational complexity may be reduced.

The subset of CCs in a PUCCH cell group (e.g., the identity of the CCs in the subset) may be communicated to the UE directly or indirectly. For example, RRC configuration information may be used to communicate the subset of CCs in the cell group. Alternatively (or in addition), DCI may be used to communicate the subset of CCs in the cell group in a more dynamic manner. As another example, the UE may recognize the identity of the CCs in the subset of CCs in the cell group based on scheduled CCs that are detected. The scheduled CCs may include CCs scheduled for PUSCH transmission and/or CCs pre-configured for UCI transmission.

With respect to a particular PUCCH cell group, the selection of a PUCCH cell may be performed on a per-frame or a per-subframe basis. If the selection is performed on a per-frame basis, a particular cell may be selected as the PUCCH cell and may then be used as the PUCCH cell during the entire frame (e.g., during all UL subframes of the frame). A different cell may be selected as the PUCCH cell during a subsequent frame, and may be used as the PUCCH cell during the subsequent frame.

If the selection is performed on a per-subframe basis, then a particular cell may be selected as the PUCCH cell for a particular subframe (e.g., a particular UL subframe) and may then be used as the PUCCH cell during that subframe. A different cell (or the same cell) may be selected as the PUCCH cell during a subsequent subframe, and may then be used as the PUCCH cell during the subsequent subframe. As such, one cell may be selected as the PUCCH cell for a subframe of a particular frame, and a different cell may be selected as the PUCCH cell for a different subframe of the same frame.

The PUCCH cell for a PUCCH cell group may be selected based on one or more of various factors. For example, one factor may be whether a cell is cleared for transmission. For example, the cell may perform a listen-before-talk during a CCA period to determine whether the cell is cleared for transmission.

The determination of whether the cell is cleared for transmission may be performed in any of various ways as known by one those skilled in the art. For example, a transmitting device (e.g., a UE) may listen to a cell (or channel) a certain number of times. If the cell clears during each of the times, then the cell may be determined to be clear for transmission.

If the cell clears for transmission, then the cell may be considered for selection as the PUCCH cell. According to a further example, the particular subframe in which the cell is cleared for transmission may be considered. In this regard, a cell that is cleared for transmission in an earlier (rather than a later) subframe may be given priority over another cell.

As a further example, if the selection of the PUCCH cell is performed on a per-frame basis, another factor that may be considered is subframe index of the first subframe that is designed as an uplink subframe. For example, a CC that has an earlier uplink subframe may be given priority during the selection of the PUCCH cell.

Whether the selection of the PUCCH cell may be performed on a per-frame or a per-subframe basis may be related to one or more RRC parameters. For example, a cell that may have a lower cell ID may be given priority over another cell when selecting the PUCCH cell.

Figure 9:
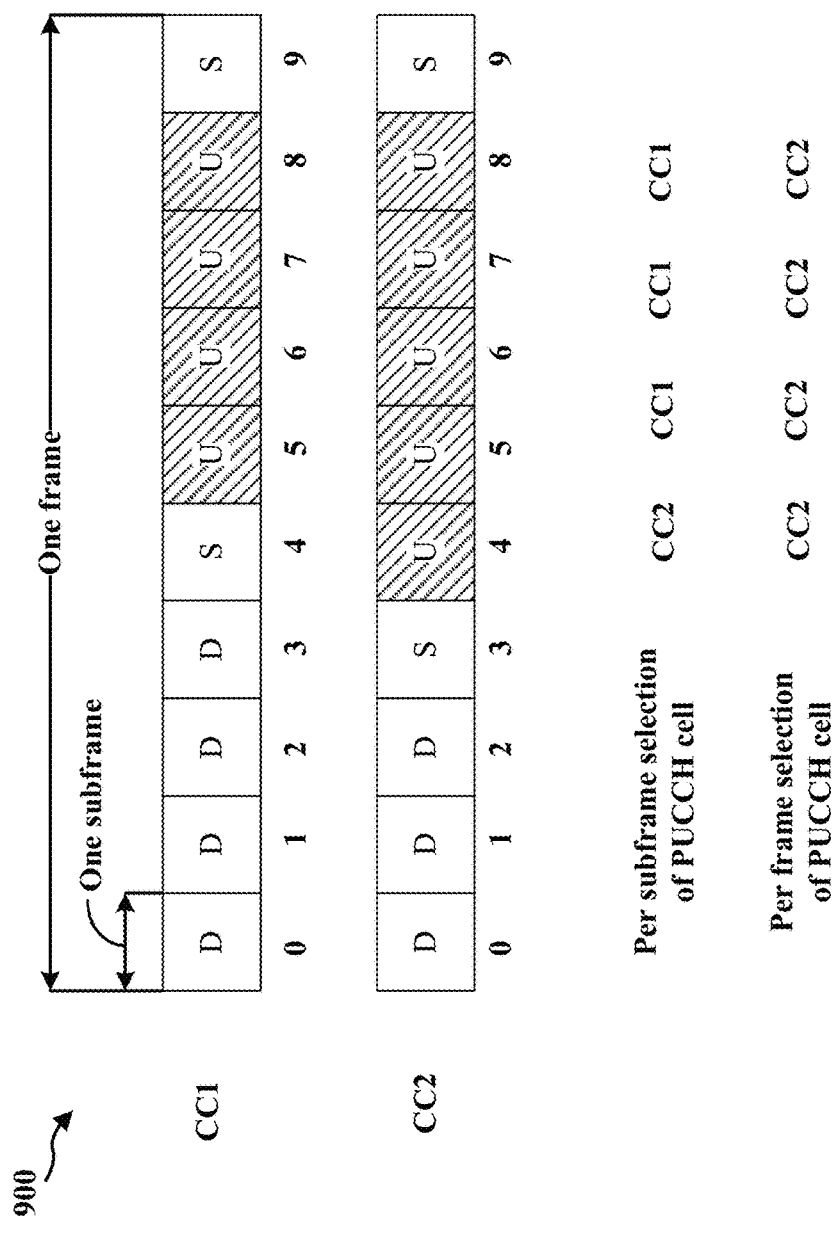
FIG. 9 illustrates an example of selecting a PUCCH cell from among two cells in a PUCCH cell group.

FIG. 9 illustrates an example 900 of selecting a PUCCH cell from among two cells in a PUCCH cell group: CC1 and CC2. Both CC1 and CC2 utilize unlicensed (or shared) spectrum. An uplink-downlink configuration is shown for each of the CCs. The configuration illustrated in FIG. 9 is for illustration purposes, and it is understood that other configurations are possible without departing from the scope of the present disclosure. In each uplink-downlink configuration, 'D' indicates that a particular subframe of a radio frame is reserved for DL transmissions, and 'U' indicates that a particular subframe is reserved for UL transmissions. 'S' indicates that a particular subframe is a special subframe. The special subframe may have three fields: DL Pilot Time Slot (DwPTS), guard period (GP), and UL Pilot Time Slot (UpPTS).

In the uplink-downlink configuration for CC1, subframes 0, 1, 2 and 3 are reserved for DL transmissions. Subframe 4 is designated as a special subframe. Subframes 5, 6, 7 and 8 are reserved for UL transmissions. Subframe 9 is designated as a special subframe.

In the uplink-downlink configuration for CC2, subframes 0, 1 and 2 are reserved for DL transmissions. Subframe 3 is designated as a special subframe. Subframes 4, 5, 6 7, and 8 are reserved for UL transmissions. Subframe 9 is designated as a special subframe.

With continued reference to FIG. 9, by way of example, assume that CC1 and CC2 are cleared for UL transmission in the special subframe 4 that is before the first UL subframe. Clearance for transmission may be provided at granularity of subframes, symbols, or any other time units. As an example, a minimum transmit time interval (TTI) may be in units of subframes, and, as a result, channel clearance is performed for specific subframes. As another example, a minimum TTI may be in units of symbols, and, as a result, channel clearance is performed for specific symbols. As depicted in FIG. 9, for CC1, the first UL subframe is subframe 5. As such, CC1 may be cleared for UL transmission in subframe 4. For CC2, the first UL subframe is subframe 4. As such, CC2 may be cleared for UL transmission in subframe 3. Furthermore, CC1 may have a lower cell index than CC2.

The selection of the PUCCH cell (from among CC1 and CC2) on a per-frame basis will now be described with respect to one aspect. As noted earlier, both CC1 and CC2 may be cleared for UL transmission. Because CC2 may be cleared for UL transmission in an earlier subframe than CC1, CC2 may be selected as the PUCCH cell for the frame illustrated in FIG. 9. Alternatively (or in addition), the subframe index of the first subframe designated as an UL subframe may be considered. For CC1, the subframe index of the first UL subframe is 5. For CC2, the subframe index of the first UL subframe is 4. Because the subframe index for CC2 is earlier than the subframe index for CC1, CC2 may be selected as the PUCCH cell for the frame illustrated in FIG. 9. Accordingly, the PUCCH may be carried in CC2's UL subframes within the frame (subframes 4, 5, 6 7, and 8). The PUCCH may carry UCI for both CC1 and CC2.

The selection of the PUCCH cell (from among CC1 and CC2) on a per-subframe basis will now be described with respect to one aspect. As noted earlier, CC1 is cleared for UL transmission in subframe 4, and CC2 is cleared with UL transmission in subframe 3. Because subframes 0, 1, 2 and 3 are not UL subframes for either CC1 or CC2, neither CC1 nor CC2 may be selected as a PUCCH cell for these subframes. Subframe 4 is not an UL subframe for CC1. However, subframe 4 is an UL subframe for CC2. Therefore, CC2 may be selected as the PUCCH cell for subframe 4.

Regarding subframes 5, 6, 7 and 8, all four of these subframes are UL subframes for both CC1 and CC2. Accordingly, an additional factor may be considered when determining which CC to select. According to one aspect, the cell indices of CC1 and CC2 may be considered. As noted earlier, CC1 may have a lower cell index than CC2. Therefore, between CC1 and CC2, CC1 may be given priority. Accordingly, CC1 may be selected as the PUCCH cell for subframes 5, 6, 7 and 8.

Figure 10:
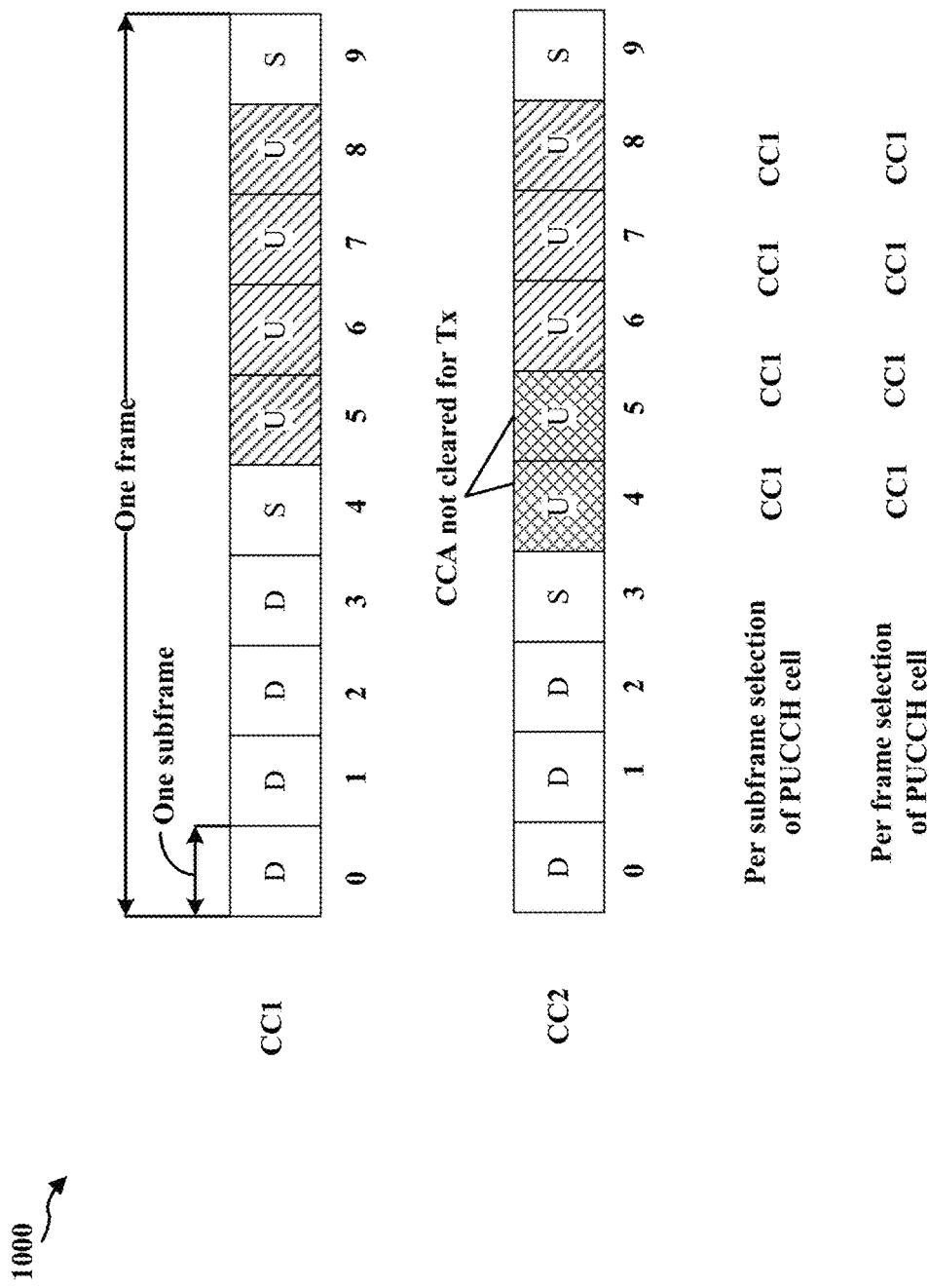
FIG. 10 illustrates another example of selecting a PUCCH cell from among two cells in a PUCCH cell group.

FIG. 10 illustrates an example 1000 of selecting a PUCCH cell from among two cells in a PUCCH cell group: CC1 and CC2. Both CC1 and CC2 utilize unlicensed (or shared) spectrum. An uplink-downlink configuration is shown for each of the CCs for purposes of illustration and not limitation.

In the uplink-downlink configuration for CC1, subframes 0, 1, 2 and 3 are reserved for DL transmissions. Subframe 4 is designated as a special subframe. Subframes 5, 6, 7 and 8 are reserved for UL transmissions. Subframe 9 is designated as a special subframe.

In the uplink-downlink configuration for CC2, subframes 0, 1 and 2 are reserved for DL transmissions. Subframe 3 is designated as a special subframe. Subframes 4, 5, 6 7, and 8 are reserved for UL transmissions. Subframe 9 is designated as a special subframe.

With continued reference to FIG. 10, by way of example, assume that CC1 may be cleared for UL transmission in special subframe 4 that is before the first UL subframe. For CC1, the first UL subframe is subframe 5. Therefore, CC1 may be cleared for UL transmission in subframe 4. However, for example, CC2 may not be cleared for UL transmission in CC2's first two UL subframes, and may not be cleared for UL transmission until subframe 6. Therefore, although subframes 4 and 5 may be designated as UL subframes in the uplink-downlink configuration for CC2, CC2 may not be cleared for UL transmission in these subframes. Furthermore, CC1 may have a lower cell index than CC2.

The selection of the PUCCH cell (from among CC1 and CC2) on a per-frame basis will now be described with respect to one aspect. As noted earlier, CC1 may be cleared for UL transmission in subframe 4, while CC2 may not be cleared for UL transmission until subframe 6. Because CC1 may be cleared for UL transmission in an earlier subframe, CC1 may be selected as the PUCCH cell for the frame illustrated in FIG. 10. Accordingly, CC1 may be utilized to carry the PUCCH in CC1's UL subframes within the frame (subframes 5, 6, 7 and 8). The PUCCH may carry UCI for both CC1 and CC2.

The selection of the PUCCH cell (from among CC1 and CC2) on a per-subframe basis will now be described with respect to FIG. 10. As discussed supra, CC1 may be cleared for UL transmission in subframe 4, and CC2 may be cleared for UL transmission in subframe 6. Because subframes 0, 1, 2 and 3 are not UL subframes for either CC1 or CC2, neither CC1 nor CC2 may be selected as a PUCCH cell for these subframes. Subframe 4 is not an UL subframe for CC1, but is an UL subframe for CC2. However, CC2 may not be cleared for UL transmission in subframe 4. Therefore, neither CC1 nor CC2 may be selected as the PUCCH cell for subframe 4.

Subframe 5 is an UL subframe for both CC1 and CC2. CC1 may be cleared for UL transmission in subframe 5. However, CC2 may not be cleared for UL transmission in this subframe. Therefore, CC1 may be selected as the PUCCH cell for subframe 5.

Regarding subframes 6, 7 and 8, all three of these subframes are UL subframes for both CC1 and CC2. Further, both CC1 and CC2 may be cleared for UL transmission in subframes 6, 7 and 8. Accordingly, an additional factor may be considered when determining which CC to select. According to one aspect, the cell indices of CC1 and CC2 may be considered. As noted earlier, CC1 may have a lower cell index than CC2. Therefore, between CC1 and CC2, CC1 may be given priority. Therefore, CC1 may be selected as the PUCCH cell for subframes 6, 7 and 8.

As described supra (e.g., the examples illustrated in FIGS. 9 and 10), the PUCCH cell may be selected on either a per-frame basis or a per-subframe basis. In selecting on a per-subframe basis, different cells may be selected as the PUCCH cell for different subframes within a same frame (e.g., the example of FIG. 9).

According to various aspects, if all PUCCH cells use licensed spectrum, then up to two PUCCH cell groups may be configured. If at least one PUCCH cell utilizes unlicensed/shared spectrum, then at most two PUCCH cells utilizing licensed spectrum may be configured. If CCs using unlicensed/shared spectrum do not perform asynchronous transmissions in CA, the CCs may be grouped into a PUCCH cell group, and one or more PUCCH cells may be selected for the PUCCH cell group. Within each PUCCH cell group, dynamic PUCCH cell management may be performed on a per-frame basis or a per-subframe basis.

Regarding the configurations described supra with reference to FIGS. 6, 7 and 8, once a PUCCH cell using unlicensed/shared spectrum fails to grab a channel, a UE may consider transmitting UCI associated with cells corresponding to the PUCCH cell on the PUCCH of another PUCCH cell group. For example, the UE may consider transmitting UCI associated with cells corresponding to the PUCCH cell using a different PUCCH cell utilizing licensed spectrum. For example, with reference to FIG. 6, the UE may consider transmitting UCI associated with cells in the secondary PUCCH cell group 620 via the PUCCH cell CC1 of the primary PUCCH cell group 610. This may increase the likelihood of successful UCI transmission for the secondary PUCCH cell group 620, but may result in increased complexity.

According to another aspect, a UE may also consider selecting more than one PUCCH cell (e.g., two PUCCH cells) in a particular PUCCH cell group. For example, the UE may consider selecting more than one cell from among cells which have been cleared for UL transmission. This may also increase the likelihood of successful UCI transmission. However, this approach may result in an increased level of blind detection and operational complexity.

Figure 11:
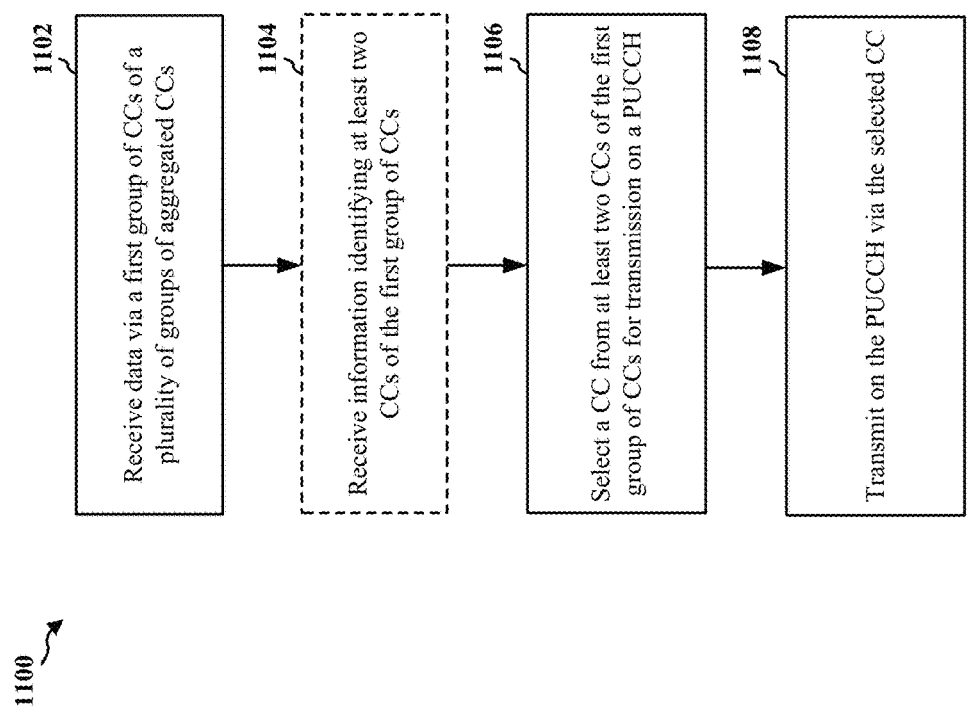
FIG. 11 is a flow chart of a method of wireless communication.

FIG. 11 is a flow chart 1100 of a method of wireless communication. The method may be performed by a UE (e.g., the UE 150, the apparatus 1202/1202').

According to one configuration, at 1102, the UE receives data via a first group of CCs of a plurality of groups of aggregated CCs (including, e.g., the aggregated CCs of FIG. 5A or 5B). The first group of CCs utilizes unlicensed or shared frequencies.

At 1104, the UE may receive information identifying at least two CCs of the first group of CCs. For example, the information may be received via RRC configuration information or via DCI.

At 1106, the UE selects a CC from at least two CCs of the first group of CCs (e.g., the identified at least two CCs of 1104) for transmission on a PUCCH. The selection of the CC may be based on at least an uplink-transmission clearance status of each of the at least two CCs.

For example, with respect to 1106, the UE may analyze and compare the uplink-transmission clearance status of each of the at least two CCs. With reference to FIGS. 9 and 10, the UE may also analyze one or more other factors, such as the first UL subframe of each CC, the cell indices of the CCs, etc. Based on such factors, the UE selects one of the CCs. The UE designates the selected CC as the PUCCH cell.

At 1108, the UE utilizes the selected CC to transmit on the corresponding PUCCH.

Figure 12:
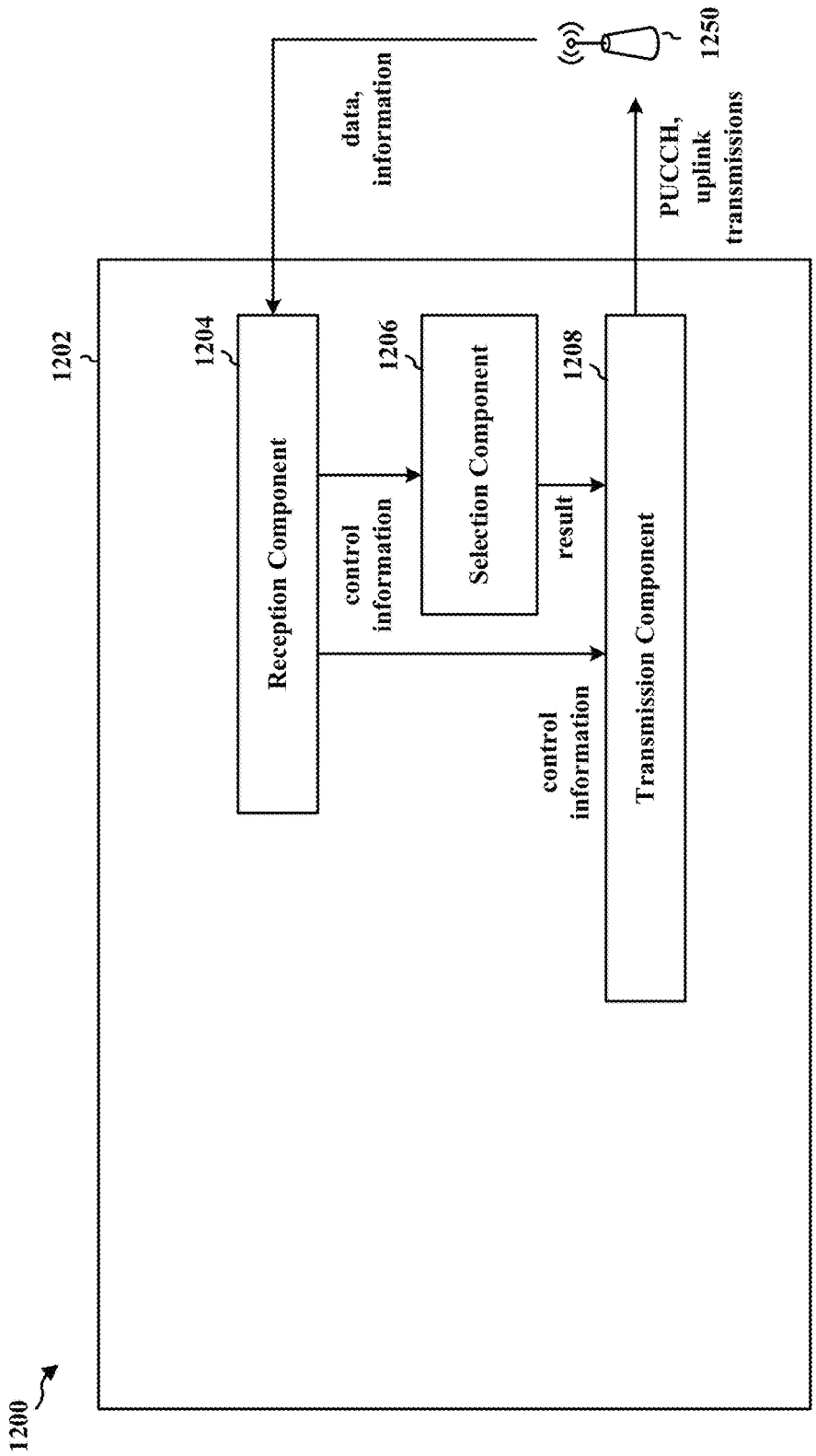
FIG. 12 is a conceptual data flow diagram illustrating the data flow between different components/means in an exemplary apparatus.

FIG. 12 is a conceptual data flow diagram 1200 illustrating the data flow between different components/means in an exemplary apparatus 1202. The apparatus may be a UE. The apparatus may include a component 1204 that receives data via a first group of CCs of a plurality of groups of aggregated CCs and that receives information identifying at least two CCs of the first group of CCs. The apparatus may further include a component 1206 that selects a CC from at least two CCs of the first group of CCs for transmission on a PUCCH. The component 1206 may select the CC based on at least an uplink-transmission clearance status of each of the at least two CCs. The apparatus may further include a component 1208 that transmits uplink data and control information (e.g., to eNB 1250).

The apparatus may include additional components that perform each of the blocks of the algorithm in the aforementioned flow chart of FIG. 11. As such, each block in the aforementioned flow chart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
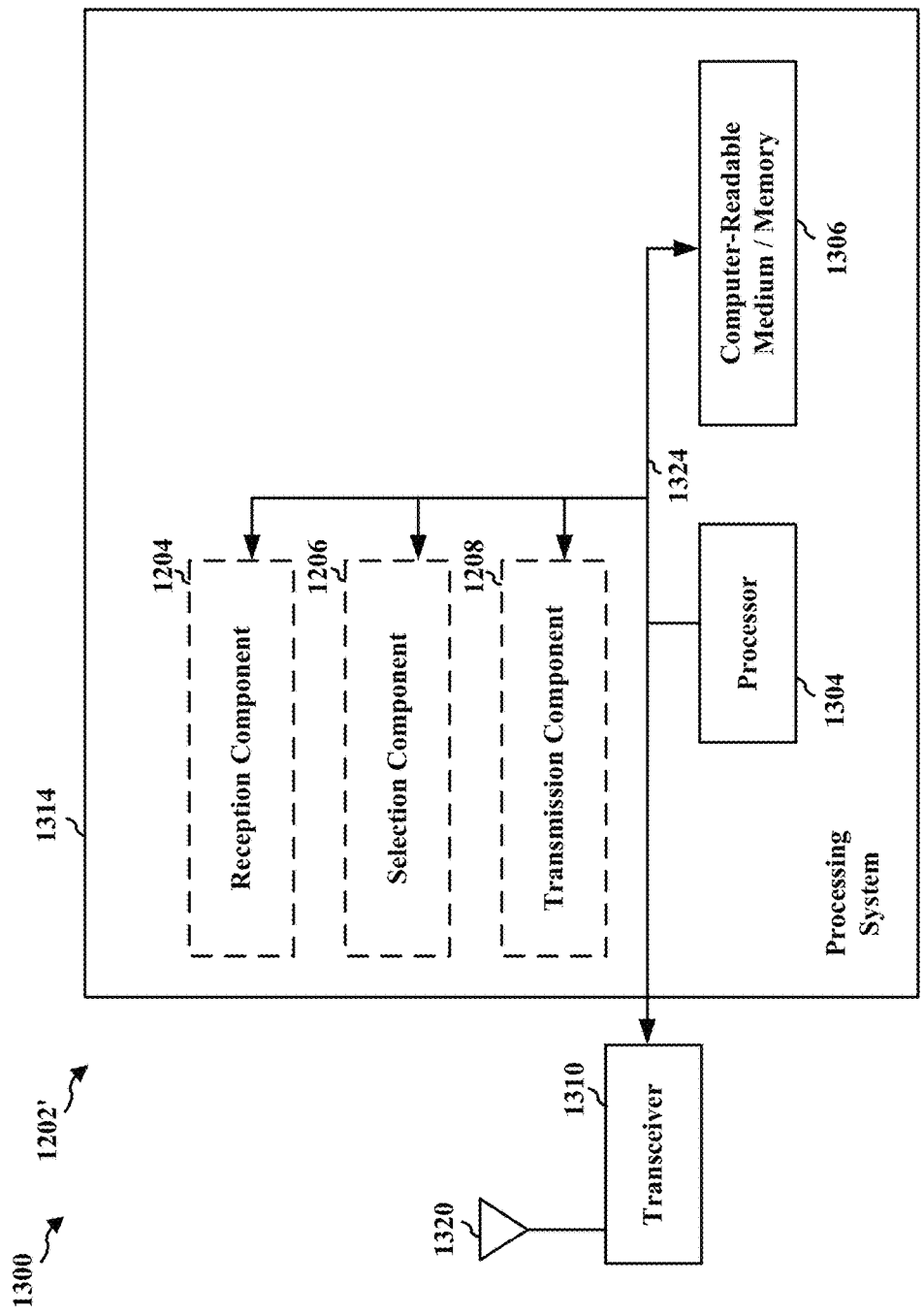
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, and the computer-readable medium/memory 1306. The bus 1324 may also link various other circuits such as timing sources, peripherals, voltage regulators, and power management circuits, which is well known in the art, and therefore, will not be described any further.

The processing system 1314 may be coupled to a transceiver 1310. The transceiver 1310 may be coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1208, and based on the received information, generates a signal to be applied to the one or more antennas 1320. The processing system 1314 may include a processor 1304 coupled to a computer-readable medium/memory 1306. The processor 1304 may responsible for general processing, including the execution of software stored on the computer-readable medium/memory 1306. The software, when executed by the processor 1304, may cause the processing system 1314 to perform the various functions described supra for any particular apparatus. The computer-readable medium/memory 1306 may also be used for storing data that may be manipulated by the processor 1304 when executing software. The processing system further may include at least one of the components 1204, 1206, 1208. The components may be software components running in the processor 1304, resident/stored in the computer readable medium/memory 1306, one or more hardware components coupled to the processor 1304, or some combination thereof. The processing system 1314 may be a component of the UE 350 and may include the memory 360 and/or at least one of the TX processor 368, the RX processor 356, and the controller/processor 359.

In one configuration, the apparatus 1202/1202' for wireless communication may include means (1204, 1310) for receiving data via a first group of CCs of a plurality of groups of aggregated CCs, the first group of CCs corresponding to unlicensed or shared frequencies. The apparatus 1202/1202' also may include means (1206, 1304) for selecting a CC from at least two CCs of the first group of CCs for transmission of a PUCCH. The selection of the CC is based on at least an uplink-transmission clearance status of each of the at least two CCs. The apparatus 1202/1202' also may include means (1208, 1310) for transmitting the PUCCH via the selected CC.

In a further configuration, the selected CC may be for transmission on the PUCCH during each of a plurality of uplink subframes of a radio frame.

In a further configuration, the selection of the CC may be further based on a cell index of each of the at least two CCs. The selected CC may be for transmission on the PUCCH during a single uplink subframe of a radio frame. The means (1206, 1304) for selecting may be configured to select a first CC from the at least two CCs for transmission of a PUCCH during a first subframe of the radio frame, and select a second CC from the at least two CCs for transmission on the PUCCH during a second subframe of the radio frame. The selected first CC and the selected second CC may be the same as each other.

In a further configuration, the apparatus 1202/1202' also may include means (1204, 1310) for receiving information identifying the at least two CCs of the first group of CCs. The information identifying the at least two CCs of the first group of CCs may be received via at least RRC configuration information or DCI.

In a further configuration, the at least two CCs of the first group of CCs correspond to CCs that are scheduled for uplink transmission.

In a further configuration, the PUCCH include UCI for each of two or more CCs of the first group of CCs. The two or more CCs may include the at least two CCs.

In a further configuration, the first group of CCs corresponds to cells in which uplink transmissions may be synchronous.

In a further configuration, the plurality of groups of aggregated CCs further include at most two groups of CCs that correspond to licensed frequencies.

The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 14:
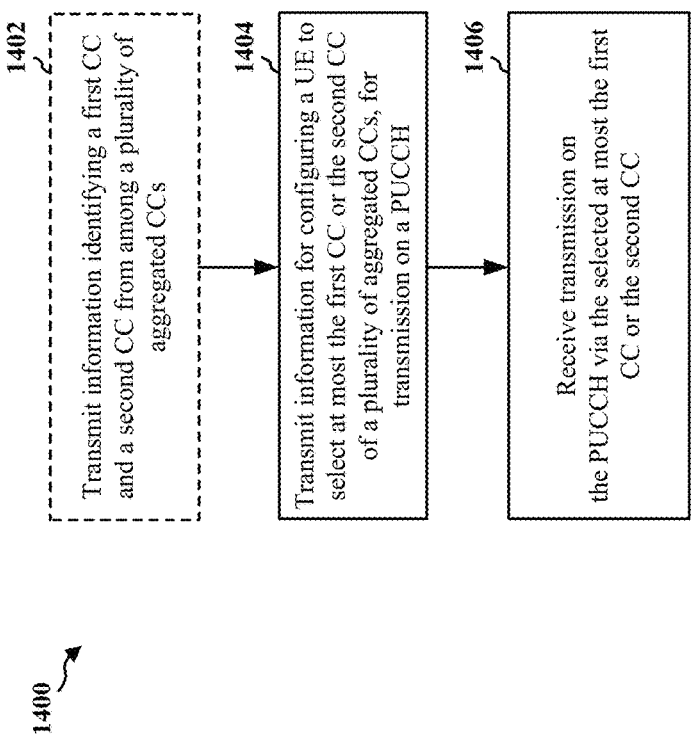
FIG. 14 is a flow chart of a method of wireless communication.

FIG. 14 is a flow chart 1400 of a method of wireless communication. The method may be performed by an eNB (e.g., the eNB 102, the apparatus 1200/1202').

According to one configuration, at 1402, the eNB may transmit information identifying a first CC and a second CC from among a plurality of aggregated CCs. For example, the information may be transmitted via RRC configuration information or via DCI.

At 1404, the eNB transmits information for configuring a UE to select at most the first CC or the second CC of the plurality of aggregated CCs, for transmission of a PUCCH. The first CC and the second CC correspond to unlicensed or shared frequencies. For example, the UE may be operating under the configuration illustrated in FIG. 6 (in which up to two PUCCH cells may be semi-statically managed). The transmitted information may cause the UE to switch to a different configuration. For example, the transmitted information may cause the UE to begin operating under the configuration illustrated in FIG. 8 (in which one of two PUCCH cells may be dynamically managed). The selection of the at most the first CC or the second CC may be based on at least an uplink-transmission clearance status of each of the first CC and the second CC.

At 1406, the eNB receives transmission on the PUCCH via the selected at most the first CC or the second CC.

Figure 15:
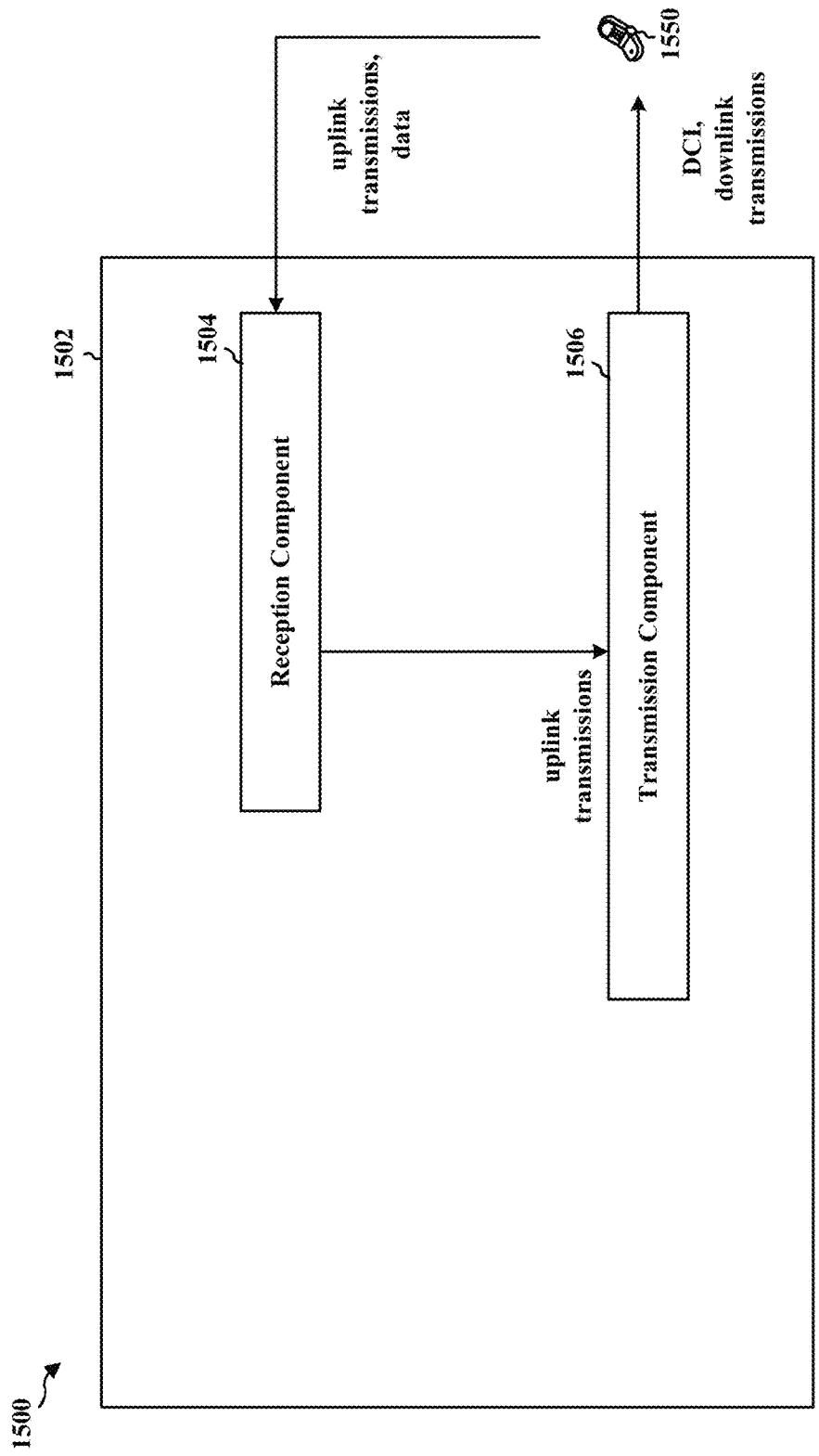
FIG. 15 is a conceptual data flow diagram illustrating the data flow between different components/means in an exemplary apparatus.

FIG. 15 is a conceptual data flow diagram 1500 illustrating the data flow between different components/means in an exemplary apparatus 1502. The apparatus may be an eNB. The apparatus may include a component 1504 that receives data and PUCCH (e.g., from UE 1550) and a component 1506 that transmits information identifying a first CC and the second CC from among a plurality of aggregated CCs, and information for configuring a UE to select at most the first CC or the second CC of the plurality of aggregated CCs, for transmission of a PUCCH.

The apparatus may include additional components that perform each of the blocks of the algorithm in the aforementioned flow chart of FIG. 14. As such, each block in the aforementioned flow chart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
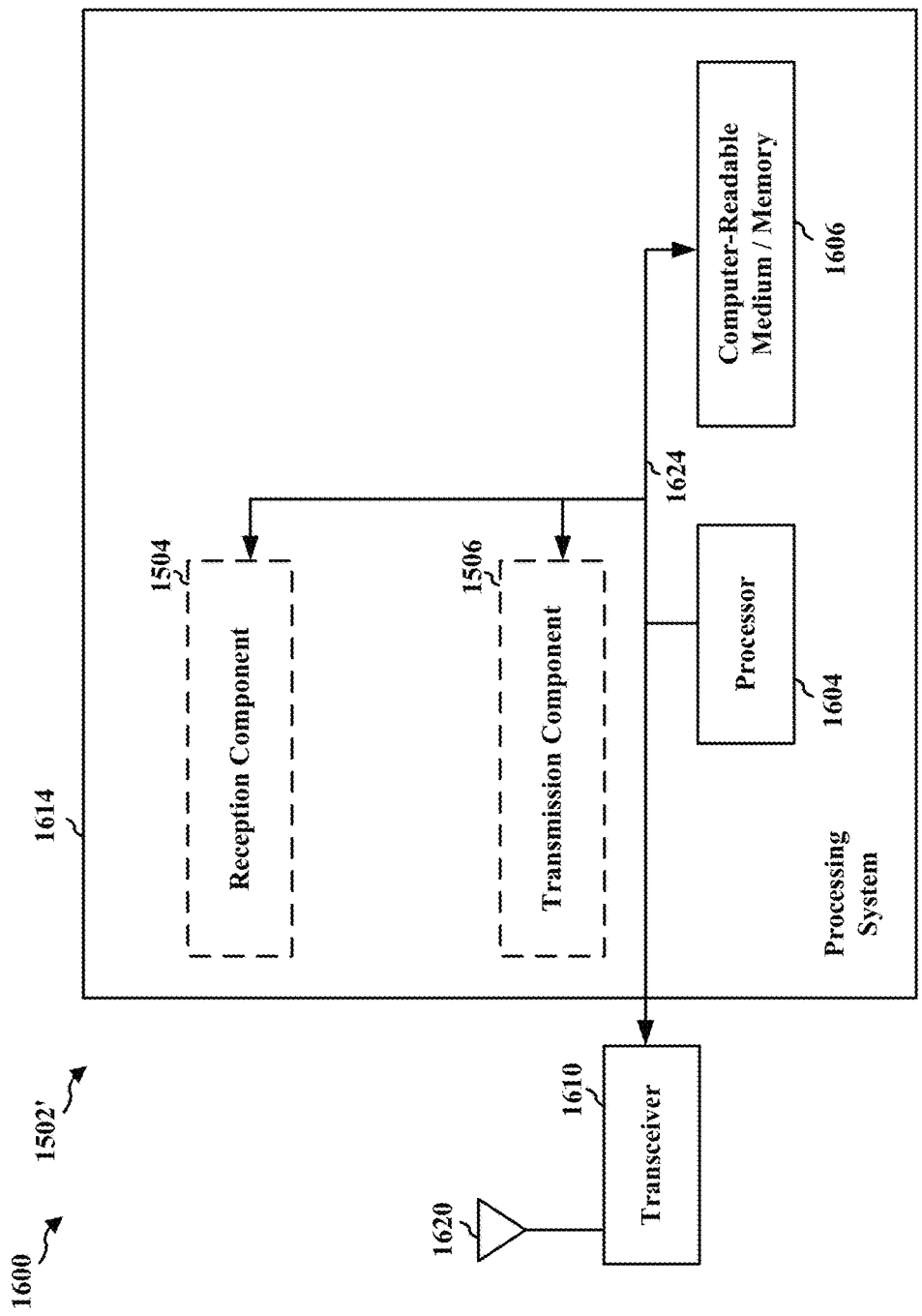
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, and the computer-readable medium/memory 1606. The bus 1624 may also link various other circuits such as timing sources, peripherals, voltage regulators, and power management circuits, which is well known in the art, and therefore, will not be described any further.

The processing system 1614 may be coupled to a transceiver 1610. The transceiver 1610 may coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 may include a processor 1604 coupled to a computer-readable medium/memory 1606. The processor 1604 may responsible for general processing, including the execution of software stored on the computer-readable medium/ memory 1606. The software, when executed by the processor 1604, may cause the processing system 1614 to perform the various functions described supra for any particular apparatus. The computer-readable medium/memory 1606 may also be used for storing data that may manipulated by the processor 1604 when executing software. The processing system further may include at least one of the components 1504, 1506. The components may be software components running in the processor 1604, resident/stored in the computer readable medium/memory 1606, one or more hardware components coupled to the processor 1604, or some combination thereof. The processing system 1614 may be a component of the eNB 310 and may include the memory 376 and/or at least one of the TX processor 616, the RX processor 370, and the controller/processor 375.

In one configuration, the apparatus 1502/1502' may include means (1506, 1610) for transmitting information for configuring a UE to select at most a first CC or a second CC of a plurality of aggregated CCs, for transmission of a PUCCH. The first CC and the second CC correspond to unlicensed or shared frequencies, and the selection of the at most the first CC or the second CC may be based on at least an uplink-transmission clearance status of each of the first CC and the second CC. The apparatus 1502/1502' further may include means (1504, 1610) for receiving the PUCCH via the selected at most the first CC or the second CC.

In a further configuration, the apparatus 1502/1502' further may include means (1506, 1610) for transmitting information identifying the first CC and the second CC from among the plurality of aggregated CCs. The information identifying the first CC and the second CC may be transmitted via at least RRC configuration information or DCI.

In a further configuration, the first CC and the second CC correspond to CCs that may be scheduled for uplink transmission.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and may be not meant to be limited to the specific order or hierarchy presented.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication, comprising:
   receiving data via a first group of component carriers (CCs) of a plurality of groups of aggregated CCs, the first group of CCs corresponding to unlicensed or shared frequencies;
   selecting a CC from at least two CCs of the first group of CCs for transmission on a physical uplink control channel (PUCCH), wherein the selection of the CC is based on at least an uplink-transmission clearance procedure performed on each of the at least two CCs, wherein the CC is furtherselected based on a first comparison of an earliest uplink subframe index associated with each of the at least two CCs or based on a second comparison of a cell index associated with each of the at least two CCs when the earliest uplink subframe index is the same for the at least two CCs; and
   transmitting uplink information on the PUCCH via the selected CC to a base station.

2. The method of claim 1, wherein the selected CC is for transmission on the PUCCH during each of a plurality of uplink subframes of a radio frame.

3. The method of claim 1, wherein:
   the selected CC is for transmission on the PUCCH during a single uplink subframe of a radio frame; and
   the selecting the CC comprises:
   selecting a first CC from the at least two CCs for transmission on the PUCCH during a first subframe of the radio frame; and
   selecting a second CC from the at least two CCs for transmission on the PUCCH during a second subframe of the radio frame.

4. The method of claim 3, wherein the selected first CC and the selected second CC are the same as each other.

5. The method of claim 1, further comprising:
   receiving information identifying the at least two CCs of the first group of CCs.

6. The method of claim 5, wherein the information identifying the at least two CCs of the first group of CCs is received via at least Radio Resource Control (RRC) configuration information or downlink control information (DCI).

7. The method of claim 1, wherein the at least two CCs of the first group of CCs correspond to CCs that are scheduled for uplink transmission.

8. The method of claim 1, wherein the PUCCH includes uplink control information (UCI) for each of two or more CCs of the first group of CCs.

9. The method of claim 8, wherein the two or more CCs include the at least two CCs.

10. The method of claim 1, wherein the first group of CCs correspond to cells in which uplinktransmissions are synchronous.

11. The method of claim 1, wherein the plurality of groups of aggregated CCs further comprise at most two groups of CCs that correspond to licensed frequencies.

12. A method of wireless communication, comprising:
transmitting information for configuring a user equipment (UE) to select at most a first component carrier (CC) or a second CC of a plurality of aggregated CCs, for transmission on a physical uplink control channel (PUCCH),
wherein the first CC and the second CC correspond to unlicensed or shared frequencies; and
receiving a transmission on the PUCCH from the UE via the selected at most the first CC or the second CC based at least in part on an uplink-transmissionclearance status associated with each of the first CC and the second CC, the transmission on the PUCCH being received based at least in part on a first comparison of an earliest uplink subframe index associated with each of the first CC and the second CC or based on a second comparison of the cell index associated with each of the first CC and the second CC when the earliest uplink subframe index is the same for the first CC and the second CC.

13. The method of claim 12, further comprising:
transmitting information identifying the first CC and the second CC from among the plurality of aggregated CCs.

14. The method of claim 13, wherein the information identifying the first CC and the second CC is transmitted via at least Radio Resource Control (RRC) configuration information or downlink control information (DCI).

15. The method of claim 12, wherein the first CC and the second CC correspond to CCs that are scheduled for uplink transmission.

16. An apparatus for wireless communication, comprising:
a memory; and
at least one processor coupled to the memory and configured to:
receive data via a first group of component carriers (CCs) of a plurality of groups of aggregated CCs, the first group of CCs corresponding to unlicensed or shared frequencies;
select a CC from at least two CCs of the first group of CCs for transmission on a physical uplink control channel (PUCCH), wherein the selection of the CC is based on at least an uplink-transmission clearance procedure performed on each of the at least two CCs, wherein the CC is further selected based on a first comparison of an earliest uplink subframe index associated with each of the at least two CCs or based on a second comparison of a cell index associated with each of the at least two CCs when the earliest uplink subframe index is the same for the at least two CCs; and
transmit uplink information on the PUCCH via the selected CC to a base station.

17. The apparatus of claim 16, wherein the selected CC is for transmission on the PUCCH during each of a plurality of uplink subframes of a radio frame.

18. The apparatus of claim 16, wherein:
the selected CC is for transmission on the PUCCH during a single uplink subframe of a radio frame; and
the at least one processor is further configured to select the CC by:
selecting a first CC from the at least two CCs for transmission on the PUCCH during a first subframe of the radio frame; and
selecting a second CC from the at least two CCs for transmission on the PUCCH during a second subframe of the radio frame.

19. The apparatus of claim 18, wherein the selected first CC and the selected second CC are the same as each other.

20. The apparatus of claim 16, wherein the at least one processor is further configured to:
receive information ide identifying the at least two CCs of the first group of CCs.

21. The apparatus of claim 20, wherein the information identifying the at least two CCs of the first group of CCs is received via at least Radio Resource Control (RRC) configuration information or downlink control information (DCI).

22. The apparatus of claim 16, wherein the at least two CCs of the first group of CCs correspond to CCs that are scheduled for uplink transmission.

23. The apparatus of claim 16, wherein the PUCCH includes uplink control information (UCI) for each of two or more CCs of the first group of CCs.

24. The apparatus of claim 23, wherein the two or more CCs include the at least two CCs.

25. The apparatus of claim 16, wherein the first group of CCs correspond to cells in which uplink transmissions are synchronous.

26. The apparatus of claim 16, wherein the plurality of groups of aggregated CCs further comprise at most two groups of CCs that correspond to licensed frequencies.

27. An apparatus for wireless communication, comprising:
a memory; and
at least one processor coupled to the memory and configured to:
transmit information forconfiguring a userequipment (UE) to select at most a first component carrier (CC) or a second CC of a plurality of aggregated CCs, for transmission on a physical uplink control channel (PUCCH),
wherein the first CC and the second CC correspond to unlicensed or shared frequencies; and
receive a transmission on the PUCCH from the UE via the selected at most the first CC or the second CC based at least in part on an uplink-transmission clearance status associated with each of the first CC and the second CC, the transmission on the PUCCH being received based at least in part on a first comparison of an earliest uplink subframe index associated with each of the first CC and the second CC or based on a second comparison of the cell index associated with each of the first CC and the second CC when the earliest uplinksubframe index is the same for the first CC and the second CC.

28. The apparatus of claim 27, wherein the at least one processor is further configured to:
transmit information identifying the first CC and the second CC from among the plurality of aggregated CCs.

* * * * *